US009934153B2

(12) United States Patent
Clemons et al.

(10) Patent No.: US 9,934,153 B2
(45) Date of Patent: Apr. 3, 2018

(54) PATCH MEMORY SYSTEM

(71) Applicant: NVIDIA Corporation, Santa Clara, CA (US)

(72) Inventors: Jason Lavar Clemons, Leander, TX (US); Chih-Chi Cheng, Santa Clara, CA (US); Daniel Robert Johnson, Austin, TX (US); Stephen William Keckler, Austin, TX (US); Iuri Frosio, San Jose, CA (US); Yun-Ta Tsai, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 328 days.

(21) Appl. No.: 14/788,593

(22) Filed: Jun. 30, 2015

(65) Prior Publication Data

US 2017/0004089 A1    Jan. 5, 2017

(51) Int. Cl.
*G06F 12/0893* (2016.01)

(52) U.S. Cl.
CPC .... *G06F 12/0893* (2013.01); *G06F 2212/454* (2013.01); *G06F 2212/455* (2013.01)

(58) Field of Classification Search
None
See application file for complete search history.

(56) References Cited

U.S. PATENT DOCUMENTS

| | | | |
|---|---|---|---|
| 2004/0160441 A1* | 8/2004 | Lokovic | G06T 15/06 345/426 |
| 2014/0181168 A1* | 6/2014 | Baksheev | G06F 17/142 708/404 |
| 2015/0089151 A1* | 3/2015 | Bolz | G06F 12/0815 711/141 |

* cited by examiner

*Primary Examiner* — Sean D Rossiter
(74) *Attorney, Agent, or Firm* — Zilka-Kotab, PC

(57) ABSTRACT

A patch memory system for accessing patches from a memory is disclosed. A patch is an abstraction that refers to a contiguous, array of data that is a subset of an N-dimensional array of data. The patch memory system includes a tile cache, and is configured to fetch data associated with a patch by determining one or more tiles associated with an N-dimensional array of data corresponding to the patch, and loading data for the one or more tiles from the memory into the tile cache. The N-dimensional array of data may be a two-dimensional (2D) digital image comprising a plurality of pixels. A patch of the 2D digital image may refer to a 2D subset of the image.

18 Claims, 22 Drawing Sheets

PATCH MEMORY SYSTEM

This invention was made with Government support under Agreement HR0011-13-3-0001 awarded by DARPA. The Government has certain rights in this invention.

FIELD OF THE INVENTION

The present invention relates to memory systems, and more particularly to a memory system optimized for computer vision, computational photography, deep neural networks, and image processing applications.

BACKGROUND

Image processing, computer vision, and other application domains often rely on two-dimensional (2D) or spatial information. Algorithms operating on such spatial information can benefit from a memory subsystem that matches memory access patterns to common memory layouts to simplify address computation and a programming model. In conventional systems, a digital image is often stored in memory in row-major or col-major order. However, many image processing algorithms may access data localized to a specific portion of the image, which requires data from different rows of the image that is not stored in a contiguous portion of memory. For example, a 5×5 convolution kernel may be used to filter a plurality of pixels in an image such that five adjacent pixels from five adjacent rows in the image are sampled to be processed by the convolution kernel. Sampling such values would require pixel data to be fetched from memory from at least five different contiguous locations. A conventional programming model would require a programmer to calculate at least five different offsets into the image file in the memory system to fetch the required data. Consequently, fetching the image data in this manner requires a plurality of instructions to fetch a contiguous, 2D portion of the image. Thus, there is a need for addressing these issues and/or other issues associated with the prior art.

SUMMARY

A patch memory system for accessing patches from a memory is disclosed. A patch is an abstraction that refers to a contiguous, array of data that is a subset of an N-dimensional array of data. The patch memory system includes a tile cache, and is configured to fetch data associated with a patch by determining one or more tiles associated with an N-dimensional array of data corresponding to the patch, and loading data for the one or more tiles from the memory into the tile cache. The N-dimensional array of data may be a two-dimensional (2D) digital image comprising a plurality of pixels. A patch of the 2D digital image may refer to a 2D subset of the image.

DETAILED DESCRIPTION

The patch memory system disclosed herein provides hardware support for performing memory access operations on particular subsets of N-dimensional arrays of data. As used herein, a "patch" refers to a contiguous, array of data that is a subset of the N-dimensional array of data. For example, a patch of a 2D digital image may include N pixels by M pixels of the digital image, such as a 5×5 pixel portion of the digital image. The patch may refer to a subset of the pixel data in the digital image represented by a group of contiguous pixels having a starting point, a height, and a width. The patch memory system is configured to translate an instruction to fetch a patch specified by one or more patch parameters into one or more memory access requests in order to fetch the subset of the data in the N-dimensional array associated with the given patch. This level of abstraction allows programmers to write simpler code for processing data in the N-dimensional arrays.

Figure 1:
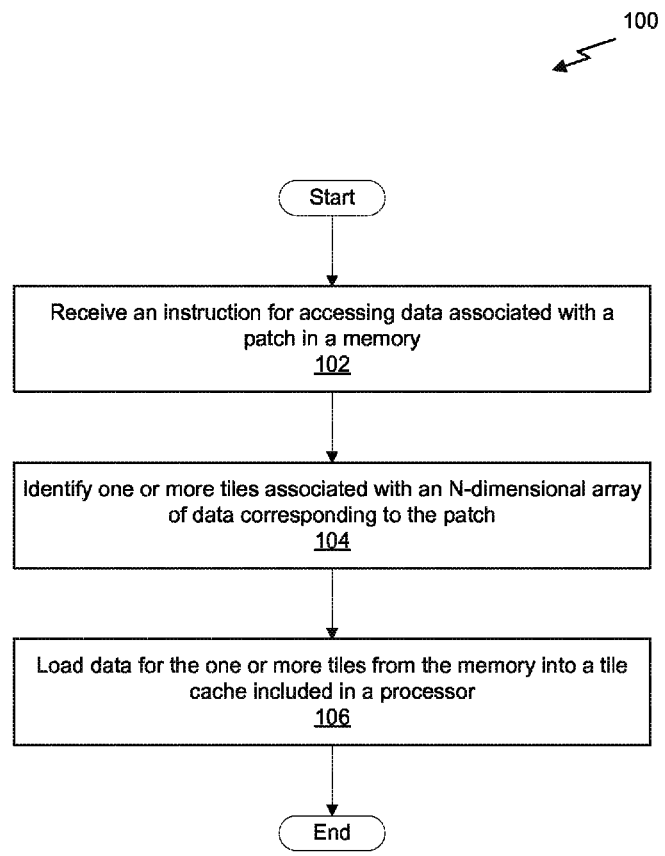
FIG. 1 illustrates a flowchart of a method for fetching a patch from a memory, in accordance with one embodiment.

FIG. 1 illustrates a flowchart of a method 100 for fetching a patch from a memory, in accordance with one embodiment. At step 102, an instruction is received for accessing data associated with a patch in a memory. In one embodiment, the instruction may include an opcode that indicates the instruction is a patch load request and an operand that specifies the patch to be loaded. The operand may be an index into a table storing the definitions for a plurality of different patches.

At step 104, the patch memory system identifies one or more tiles associated with an N-dimensional array of data corresponding to the patch. As used herein, a "tile" refers to a contiguous, array of data that is a subset of the N-dimensional array of data. A tile, therefore, is similar to a patch, except the size of a tile is typically fixed based on the architecture of a particular system, whereas the size of a patch may be chosen arbitrarily in order to fit a particular algorithm. Considerations for choosing a tile size may include a size of a memory interface, a bandwidth requirement for transferring a tile to/from memory, etc. In addition, tiles are non-overlapping. In other words, data from the N-dimensional array of data stored in one tile will not be stored in another tile. In contrast, patches may overlap. In other words, particular data in the N-dimensional array of data may be included in two or more patches at different locations relative to each patch.

In one embodiment, a tile may refer to a cache line storing a plurality of pixels in an image, where each pixel of the cache line is included in a single row or single column of the image. In another embodiment, a tile may refer to a plurality of cache lines storing a plurality of pixels in an image, where the plurality of cache lines include pixel data for pixels in multiple rows and multiple columns of the image (e.g., a 32 pixel by 32 pixel subset of the image). In general, a tile can be one dimensional (i.e., a row of pixels, a column of pixels, etc.), two dimensional (i.e., two or more rows of pixels or two or more columns of pixels, etc.), three dimensional (i.e., cubic subsets of volumetric data, etc.), or more.

In one embodiment, the N-dimensional array of data is an image comprising a two-dimensional array of pixels. Each pixel may include data for one or more channels (e.g., R, G, and B channels). The image may be divided into a plurality of non-overlapping tiles having a size of M pixels by N pixels. The data in the image may be stored by allocating contiguous portions of the memory to store the various tiles of the image. For example, an image may be divided into 32 pixel by 32 pixel tiles, and a plurality of tiles that represent the image are then stored in the memory.

In another embodiment, the N-dimensional array of data is a volumetric image comprising a three-dimensional array of voxels. Tiles of the three-dimensional array of voxels may be two dimensional (i.e., subsets of voxels where all of the voxels in the tile share at least one common value for one dimension) or may be three dimensional (i.e., cubic portions of the volumetric image). The patch memory system may determine which tiles are associated with a patch using a calculation based on an origin of the patch relative to an origin of the image, a size of the patch, and a known, fixed size of the tiles.

At step 106, data for the one or more tiles is loaded from the memory into a tile cache included in the processor. In one embodiment, the patch memory system loads each tile associated with a patch into a tile cache. The tile cache may be configured to check a tag array to check if each tile in the one or more tiles is resident in the cache. If the determination for a particular tile results in a cache hit, then the tile is already located in the tile cache and the data does not need to be fetched from the memory. However, if the determination for a particular tile results in a cache miss, then the tile is not located in the tile cache and the tile cache will cause the data for the tile to be fetched from the memory. In one embodiment, the tile cache sends a request to a tile access unit in a memory interface to fetch the tile from the memory. The physical memory addresses for the data associated with a tile are determined and a memory access request is sent from the patch memory system to a memory controller coupled to the memory. The data is received from the memory controller by the memory interface and stored in the tile cache.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
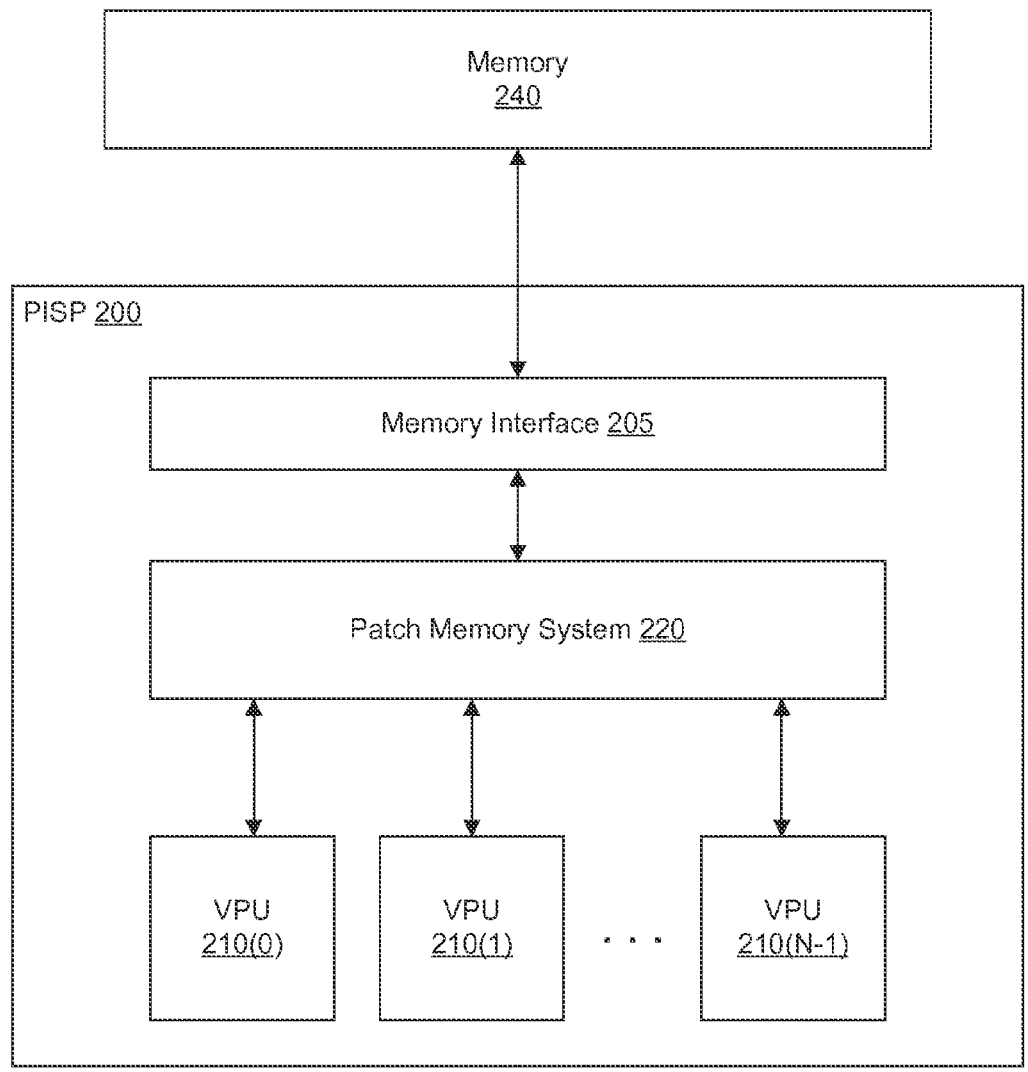
FIG. 2 illustrates a programmable image signal processor, in accordance with one embodiment.

FIG. 2 illustrates a programmable image signal processor 200, in accordance with one embodiment. The programmable image signal processor (PISP) 200 may be implemented as an integrated circuit on a silicon substrate. As shown in FIG. 2, the PISP 200 may include a patch memory system 220 coupled to a plurality of vector processing units (VPUs) 210. The PISP 200 also includes a memory interface 205 coupled to the patch memory system 220 as well as an external memory 240 via a bus or other type of interconnect. In one embodiment, the memory 240 is a dynamic random access memory (DRAM), such as a DDR3 SDRAM. The memory interface 205 receives memory access requests from the patch memory system 220 that cause data to be fetched from the memory 240 or data to be loaded into the memory 240.

Each VPU 210 is configured to operate on a one-dimensional array of data. In one embodiment, each VPU 210 is a single instruction, multiple data (SIMD) processor that contains four lanes for operating on a vector having four data elements. For example, each VPU 210 may be configured to execute an instruction on four discrete data elements in parallel. Each data element may be associated with a different pixel in a digital image.

The patch memory system 220, as described in more detail below in conjunction with FIGS. 4A-4E, may enable a programming model to efficiently utilize a single instruction in order to access portions of an N-dimensional array of data. In one embodiment, each N-dimensional array of data represents a 2D digital image including a plurality of pixels. Conventionally, accessing a 2D array of data from a digital image within a program would require multiple instructions, each instruction configured to access a subset of data in the 2D array of data. For example, where a 5×5 window of pixel data needs to be fetched from the memory, each row of 5 pixels in the 5×5 window of pixel data may need to be fetched separately. For example, a first row of five pixels in the 5×5 window of pixel data may be fetched by a first memory access request, a second row of five pixels in the 5×5 window of pixel data may be fetched by a second memory access request, and so forth until all five rows of pixels in the 5×5 window of pixel data have been fetched. All five rows are not typically fetched using a single memory access request because each row of 5 pixels may be interspersed within the digital image data in the memory. Such conventional programming models require separate instructions for each memory access request to be included within the program.

In contrast, the patch memory system 220 includes hardware for decoding a single memory access request for a specific patch of the N-dimensional array of data and generating the multiple memory access requests automatically. For example, the programming model may include an instruction to fetch a 5×5 window of pixel data, where the instruction includes an operand or operands that specify an origin of the 5×5 window (e.g., an <x, y> location in the image), a height of the 5×5 window (e.g., 5 pixels), and a width of the 5×5 window (e.g., 5 pixels). The patch memory system 220 will automatically decode the instruction and generate one or more memory access requests for the memory interface 205 in order to fetch all of the data in the 5×5 window. This abstraction makes programming easier and increases maintainability because the program only needs to include a single instruction to access the array of data rather than multiple instructions.

Figure 3A:
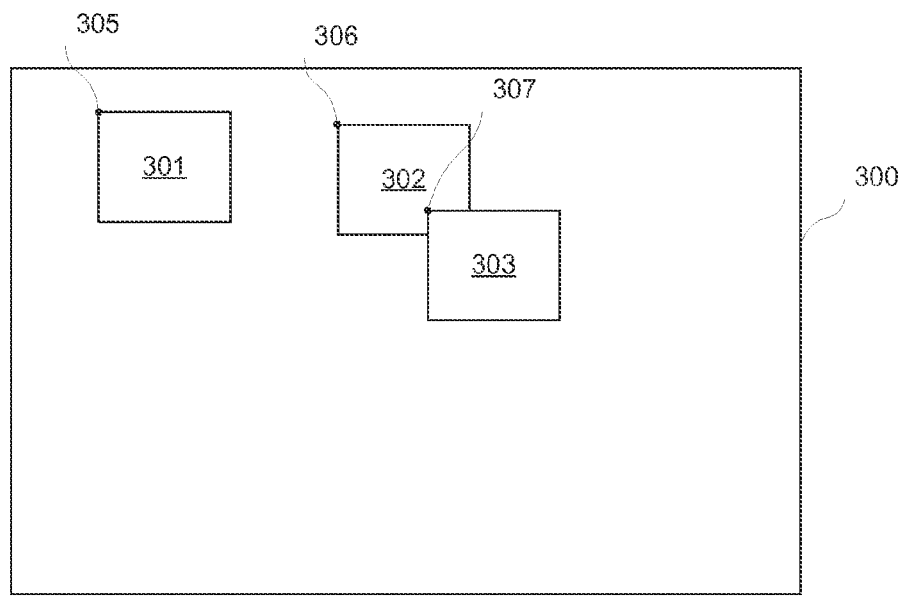
FIG. 3A illustrates a plurality of patches associated with a digital image, in accordance with one embodiment.

FIG. 3A illustrates a plurality of patches associated with a digital image 300, in accordance with one embodiment. As shown in FIG. 3A, the digital image 300 is a 2D array of pixel data. The digital image 300 may be associated with a resolution having a number of horizontal pixels and a number of vertical pixels. Each pixel may contain data for one or more channels. For example, the digital image 300 may have a resolution of 1920×1080 pixels (e.g., 1080p, etc.), each pixel including data for three channels such as a red channel, a green channel, and a blue channel. Of course, the digital image 300 may have a different resolution (e.g., VGA, UHD, 4K, etc.) or a different pixel format (e.g., RGBA, YUV, Grayscale, etc.).

Each patch refers to a contiguous array of data that is a subset of the data in the 2D array of pixel data in the digital image 300. In other words, a patch refers to a portion of the digital image 300. The patch may comprise a window of pixels in the digital image 300 specified by an origin, a height, and a width. As shown in FIG. 3A, a first patch 301 is associated with an origin 305 at an upper-left pixel in the patch 301; a second patch 302 is associated with an origin 306 at an upper-left pixel in the patch 302; and a third patch 303 is associated with an origin 307 at an upper-left pixel in the patch 303.

A patch may be specified by a data structure that identifies the patch relative to an origin of the digital image 300. The pixel data of the digital image 300 may be stored in row-major order in a contiguous group of memory addresses, either physical addresses or virtual addresses, and the patch data structure may include a first field that specifies an origin of the patch as a location of a particular pixel in the digital image 300. In one embodiment, the first field may include a two-coordinate vector that specifies the location of the upper-left pixel in the patch. For example, the two-coordinate vector may include a horizontal coordinate that specifies a column of pixels in the digital image 300 that includes the upper-left pixel in the patch and a vertical coordinate that specifies a row of pixels in the digital image 300 that includes the upper-left pixel in the patch. The pixel data for the upper-left pixel in the patch may then be located based on a number of bytes utilized to encode each pixel and a number of pixels in each row of pixels of the digital image 300. In another embodiment, the first field may include an offset, in bytes, that points to a location of the upper-left pixel in the patch relative to a base address of the digital image 300.

The patch data structure may also include a second field and a third field that identifies a height and width of the patch, respectively. In one embodiment, the height and width fields may specify a number of rows and columns in the patch, respectively. In another embodiment, the height field may specify a number of rows in the patch and the width field may specify a length, in bytes, of the data associated with a particular row in the patch.

The patch data structure may also include additional fields, such as a field that identifies a particular image corresponding to the patch. In one embodiment, a field may include a base address of a digital image associated with the patch. In another embodiment, the field may include an index to a table that specifies the image associated with the patch. The table may include multiple elements, each element storing data associated with a different image in the memory. A particular element identified by the index may include the base address of the corresponding image in the memory as well as metadata associated with the image, such as a resolution of the image, a size, in bytes, of each row of pixel data in the image, and so forth.

In some embodiment, the patch data structure does not include a field identifying a particular image corresponding to the patch. Instead, a separate instruction associates a particular image with each subsequent patch specified by an instruction received by the patch memory system 220. For example, a base address for a particular image is loaded into a register in the patch memory system 220. Subsequently, every patch specified by an instruction received by the patch memory system 220 inherently corresponds with that image until a new base address associated with a different image is loaded into the register.

Figure 3B:
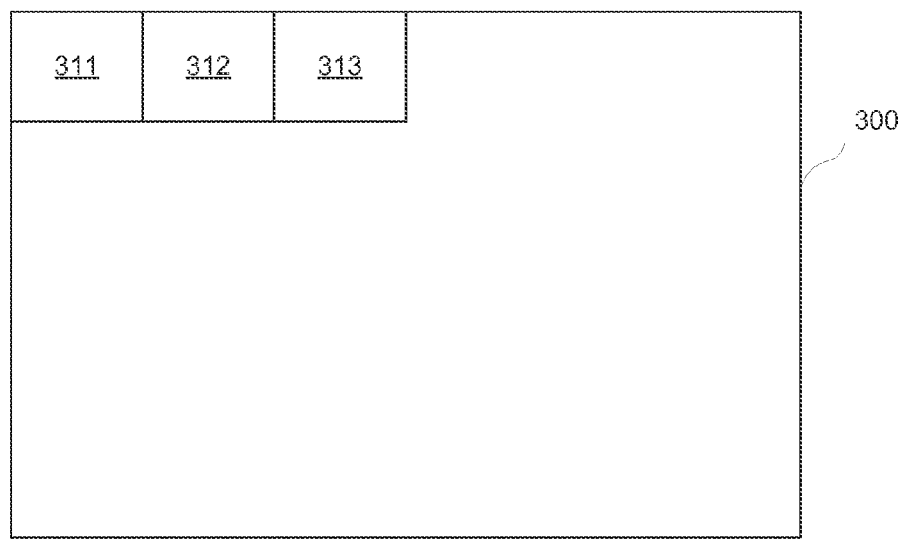
FIG. 3B illustrates the digital image subdivided into a plurality of tiles, in accordance with one embodiment.

FIG. 3B illustrates the digital image 300 subdivided into a plurality of tiles, in accordance with one embodiment. Tiles are a 2D array of contiguous pixels in the digital image 300. Each tile represents a non-overlapping subset of pixels in the digital image 300. It will be appreciated that, in contrast to tiles, patches (e.g., 301, 302, 303, etc.) may overlap and do not correspond to tile boundaries, whereas tiles (e.g., 311, 312, 313, etc.) do not overlap and have fixed boundaries determined based on the size of a tile. The digital image 300 may be stored in the memory 240, with the pixel data for each tile of the digital image 300 being stored in contiguous addresses in the memory 240. Different tiles may be stored in non-contiguous sections of memory such that the digital image 300, as a whole, is not stored in a contiguous portion of the memory. Typically, the size of a tile is fixed, such as 32 pixels by 32 pixels (32×32) or 64 pixels by 64 pixels (64×64), and may be related to a memory bandwidth required to transfer the data for a tile from the memory 240 to the PISP 200. In contrast, the size of a patch may be set by a programmer based on the requirements of a particular algorithm (e.g., a 5×5 pixel patch, a 4×6 pixel patch, etc.), and an origin of a patch may be located at any pixel coordinate location in the image 300.

It will be appreciated that a tile refers to a portion of the digital image 300 that is stored in the memory as a contiguous chunk of data, and a patch refers to a contiguous portion of the data included in the digital image 300 that may include data stored in one or more tiles, or portions thereof.

Figure 3C:
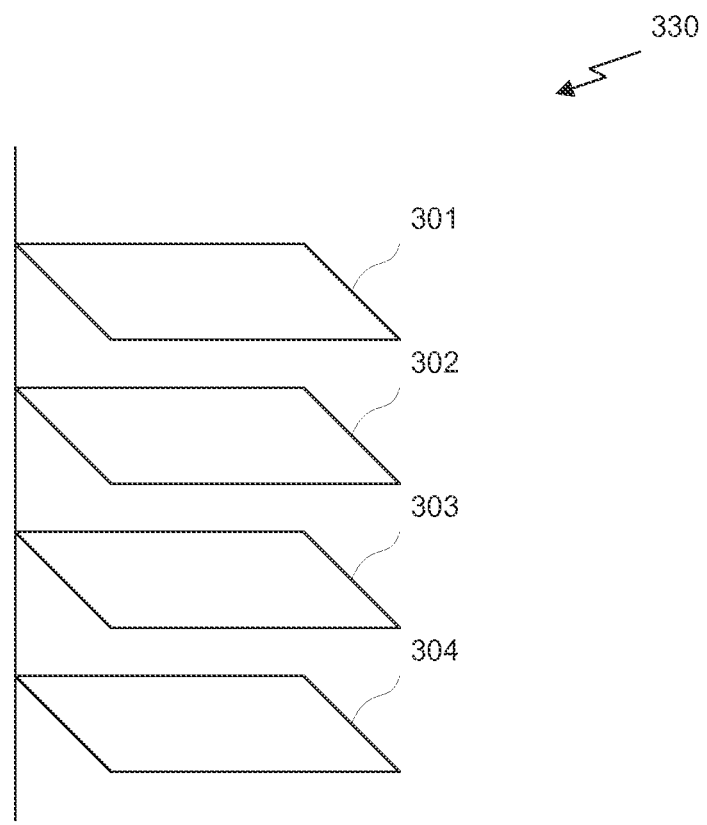
FIG. 3C illustrates a tensor data structure, in accordance with one embodiment.

FIG. 3C illustrates a tensor data structure 330, in accordance with one embodiment. A tensor refers to a collection of patches. For example, as shown in FIG. 3C, the tensor 330 includes a collection of four patches (e.g., 301, 302, 303, and 304). In one embodiment, a data structure representing the tensor 330 includes a number of fields, each field including a patch data structure for a different patch. Alternatively, each field may include a pointer to a patch data structure for the patches in the collection, or an index into a patch table that stores the data for each of the different patches. In some embodiments, each patch included in the collection is required to have a constant size. In other embodiments, each patch included in the collection may have a different size. For example, a first patch may include a 3×3 window of pixel data, a second patch may include a 5×5 window of pixel data, a third patch may include a 7×7 window of pixel data, and so forth.

Each vector in the list of vectors included in the first field of a tensor may specify the origin of one of the patches included in the tensor. In one embodiment, each vector may be a two-coordinate vector that specifies the location of the upper-left pixel in a corresponding patch included in the tensor relative to an origin of a particular digital image associated with all patches in the tensor. In another embodiment, patches within a given tensor may be associated with different images. In such an embodiment, each vector may be a three-coordinate vector that specifies a particular image associated with the patch as well as the location of the upper-left pixel in a corresponding patch included in the tensor relative to an origin of the particular image. For example, the three coordinate vector may specify an index of an image included in an image table that lists a plurality of images stored in the memory, a horizontal coordinate that specifies a column of pixels in the corresponding image that includes the upper-left pixel in the patch, and a vertical coordinate that specifies a row of pixels in the corresponding image that includes the upper-left pixel in the patch.

In general, the patch memory system 220 is not limited to digital image data. In other words, the patches (301, 302, 303, etc.) may reference any subset of data stored in a larger N-dimensional array of data, each data element including data for one or more channels. For example, the array of data could refer to a depth map storing depth values (i.e., z values) at discrete positions specified via a two element vector (i.e., an <x, y> vector). In another example, the array of data could refer to a volumetric image comprising a plurality of voxels, each voxel associated with a data element, including one or more channels, located at discrete positions specified via a three element vector (i.e., an <x, y, z> vector). In yet another example, the array of data could refer to video data comprising a plurality of image frames, each pixel included in the video data specified via a three element vector (i.e., an <x, y, t> vector, where t refers to a discrete image frame in the video data).

While many of the examples illustrated in the present specification apply to a 2D digital image comprising a plurality of pixels, nothing in the specification should be construed as limiting the patch memory system 220 to only digital image data specified as pixels in a 2D array. In general, the patch memory system 220 may operate on patches that reference a portion of an N-dimensional array of data and tensors that reference a collection of patches from either a single N-dimensional array of data or multiple N-dimensional arrays of data.

Figure 4A:
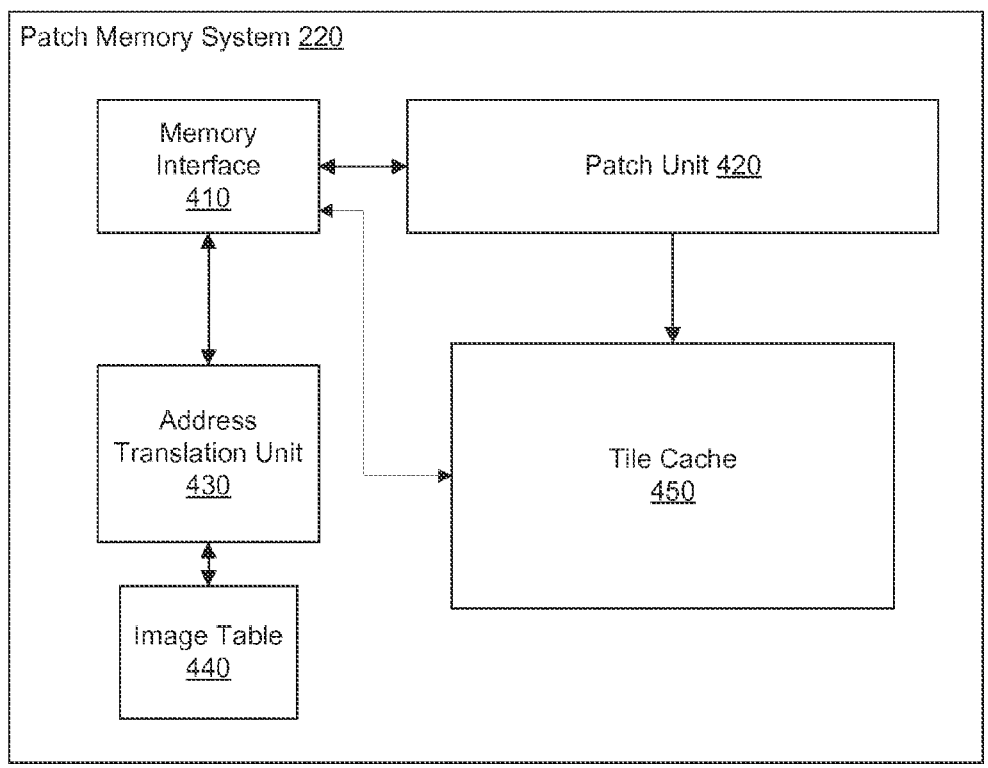
FIG. 4A illustrates the patch memory system of FIG. 2, in accordance with one embodiment.

FIG. 4A illustrates the patch memory system 220 of FIG. 2, in accordance with one embodiment. In the embodiment shown in FIG. 4A, the cache implemented by the patch memory system 220 is a tile cache, which is used to temporarily store tiles retrieved from the memory 240. It will be appreciated that in other embodiments, the patch memory system 220 may implement a conventional cache unit that retrieves cache lines from the memory 240, where the data in the N-dimensional array is stored in the cache lines. In such embodiments, the patch memory system 220 may include logic for determining which cache lines overlap with a patch and logic for fetching overlapping cache lines into the cache.

As shown in FIG. 4A, the patch memory system 220 includes a memory interface 410, a patch unit 420, an address translation unit 430, an image table 440, and a tile cache 450. The patch memory system 220 is configured to process instructions associated with the patch memory system 220 that enable various abstractions of data to be utilized in order to simplify the instructions. For example, the patch memory system 220 may be configured to directly access data words (i.e., vectors) in the memory based on a first set of instructions, access tiles of image data based on a second set of instructions, or access patches (e.g., one or more tiles of image data) based on a third set of instructions. The programmer may then choose to utilize the various instructions in the programs to simplify the programming model. In one embodiment, the patch memory system 220 may also be configured to process tensor instructions that are related to a collection of patches.

Figure 4B:
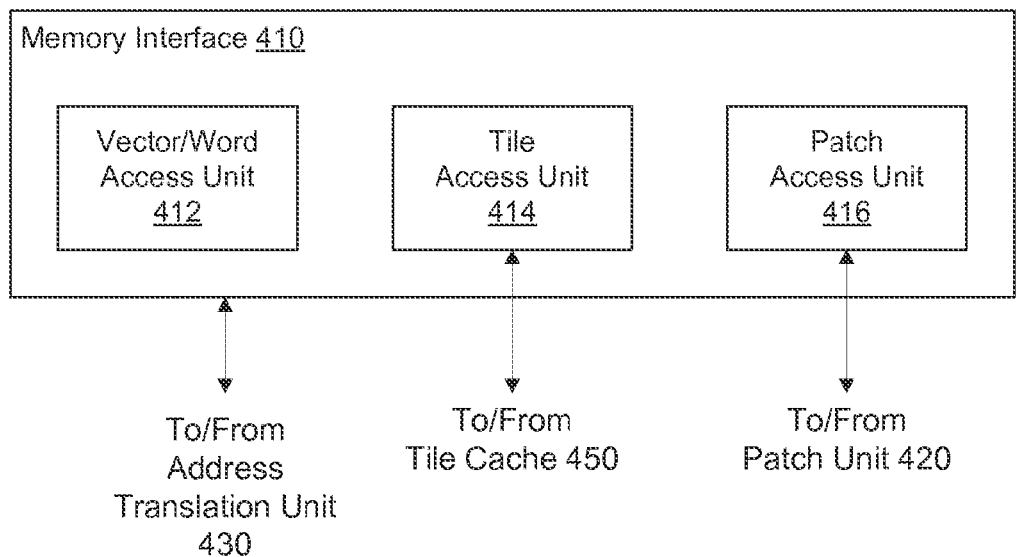
FIG. 4B illustrates the memory interface of FIG. 4A, in accordance with one embodiment.

FIG. 4B illustrates the memory interface 410 of FIG. 4A, in accordance with one embodiment. The memory interface 410 includes a vector/word access unit 412, a tile access unit 414, and a patch access unit 416. The vector/word access unit 412 may process instructions for accessing a particular data word from the memory 240. In one embodiment, the instructions may include an opcode such as a Load Word opcode (LDW) and an operand that provides an address of the word in the memory 240. The vector/word access unit 412 may transmit a memory access request to the memory interface 205 to access the data word located at the address in the memory 240.

The tile access unit 414 may process instructions for accessing a particular tile associated with an N-dimensional array from the memory 240. In one embodiment, the instructions may include an opcode such as a Load Tile opcode (LDT) and an operand that provides a two-dimensional index (e.g., <i,j>, etc.) of the tile in a particular image. The tile access unit 414 may be configured to associate all received tile access instructions with a particular image defined in the image table 440 via a separate instruction. The tile access unit 414 may utilize the address translation unit 430 to convert the index into one or more addresses for data words associated with the tile. The address translation unit 430 may convert the index into the address or addresses based on a base address for the corresponding image stored in the image table 440 and a known size of each tile. In another embodiment, the tile access instructions may also include an operand that specifies an index for the image associated with the given tile in the image table 440. In other words, the instructions include the information about the image to associate with the tile rather than requiring a separate instruction to configure the tile access unit 414.

The patch access unit 416 may process instructions for accessing a particular patch associated with an image from the memory 240. In one embodiment, the instructions may include an opcode such as a Load Patch opcode (LDP) and an operand that provides an index for the patch. The index may refer to a patch defined in a patch table stored in the patch unit 420, discussed in more detail below, and the patch table may store information for determining which tiles of a particular image are intersected by the patch thereby enabling those tiles to be accessed by the patch memory system 220.

In one embodiment, the patch access unit 416 may receive an instruction to load a patch from the memory 240 into the tile cache 450 such that one or more VPUs 210 may access the data associated with the patch. The patch access unit 416 is configured to transmit a signal to the patch unit 420 to load the patch into the tile cache 450. The patch unit 420 retrieves the information associated with the patch from the patch table and requests the tile cache 450 to load the data for the tiles associated with the patch into the tile cache 450. The operation of the patch unit 420 and the tile cache 450 will be discussed in more detail below.

If one or more tiles associated with the patch are not stored locally in the tile cache 450 (i.e., there is a cache miss), then the tile cache 450 requests the memory interface 410 to retrieve the tile(s) from the memory 240. Again, the memory interface 410, via the tile access unit 414, is configured to fetch all of the data for a particular tile from the memory 240. In one embodiment, the tile access unit 414 generates a number of addresses associated with the tile by translating a corresponding number of pixel coordinate locations associated with the tile via the address translation unit 430. The addresses may then be utilized by the vector/word access unit 412 in order to request the corresponding data from the memory 240. For example, the tile access unit 414 may iterate through all pixel coordinates included in a particular tile, translating each pixel coordinate into a memory address utilizing the address translation unit 430 and causing the memory interface 410, via the vector/word access unit 412, to generate a memory access request including the translated address to be sent to the memory interface 205. In one embodiment, the vector/word access unit 412 may be configured to coalesce multiple memory access requests together to form a longer memory access request that fits within a fixed memory bandwidth associated with the memory 240.

For example, a tile may be 32 pixels wide by 32 pixels high, meaning each tile includes 1024 pixels. The tile access unit 414 may request a memory address to be translated for each pixel in the tile based on that pixel's coordinates relative to a base address for the tile. The address translation unit 430 may generate the address for the pixel and transmit the address to the vector/word access unit 412, which then coalesces memory access requests for multiple pixels into a single memory access request that aligns with the rows of the memory 240. For example, if the memory 240 is a DDR3 SDRAM, then each memory access request may return a memory word that is 512 bits wide (i.e., the DDR3 SDRAM utilizes a 64-bit memory interface using an 8n prefetch buffer). If the memory architecture is setup to utilize a dual channel rather than single channel memory interface, then each memory access request may return a memory word that is 1024 bits wide. If each pixel is associated with 4 bytes of data (e.g., RGBA, etc.), then each memory access request, to a single channel DDR3 SDRAM memory, could return data for 16 adjacent pixels. Thus, the vector/word access unit 412 may coalesce memory access requests for the 1024 pixels of the tile into 64 distinct memory access requests using a single channel DDR3 SDRAM memory interface.

Although the tile access unit 414 is described above as translating each pixel coordinate for the tile to a separate memory address and the vector/word access unit 412 is described above as coalescing the memory access requests into wider memory access requests, in an alternative embodiment, the tile access unit 414 may be configured to only translate specific pixel coordinates for the tile to memory addresses for the memory access requests generated by the vector/word access unit 412. For example, the tile access unit 414 may be configured such that tiles are aligned with the rows of the memory and only the first pixel coordinate and seventeenth pixel coordinate in each row of a 32 pixel by 32 pixel tile are translated into memory addresses, which each represent a single memory access request for 16 pixels at a time. Thus, the vector/word access unit 412 does not coalesce memory access requests into larger memory access requests, and the coalescing is inherently handled by which pixel coordinates in the tile are translated by the tile access unit 414.

In one embodiment, the memory 240 is a dual channel DDR3 SDRAM memory, where each memory access request returns 1024 bits, or 128 bytes of data. Consequently, with 32 pixel×32 pixel tiles, each memory access request will return data for all 32 pixels in a particular row of the tile. In such an embodiment, the tile access unit 414 may only request the address translation unit 430 to translate the first pixel coordinate in each row of a tile in order to generate the memory addresses for the memory access requests. Such operations make the design of the tile access unit 414 simpler because all the tile access unit 414 needs to do to find the next pixel coordinate location is add one to the y coordinate value of the previous pixel coordinate location in the tile.

Figure 4C:
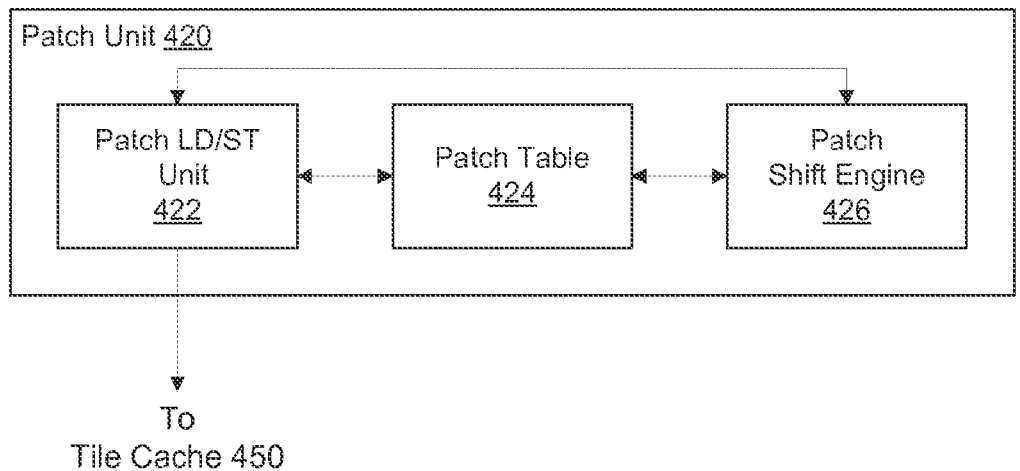
FIG. 4C illustrates the patch unit of FIG. 4A, in accordance with one embodiment.

FIG. 4C illustrates the patch unit 420 of FIG. 4A, in accordance with one embodiment. The patch unit 420 includes a patch load/store (LD/ST) unit 422, a patch table 424, and a patch shift engine 426.

The patch LD/ST unit 422 receives commands from the patch access unit 416 of the memory interface 410. In one embodiment, the commands from the patch access unit 416 include an index into the patch table 424 that identifies a particular patch corresponding to the command. The patch table 424 includes information for a plurality of patches loaded into the patch memory system 220. In one embodiment, each entry in the patch table 424 contains the information listed in Table 1.

TABLE 1

| Field | Use | Bits |
|---|---|---|
| Image ID | ID for source image | 8 |
| Origin Offset | 2D Origin offset relative to the patch | 12 |
| Width | Patch Width (px) | 6 |
| Height | Patch Height (px) | 6 |
| Channels | Number of Channels | 3 |
| Row Step | Distance to next Row (px) | 12 |
| Column Step | Distance to next Column (bytes) | 5 |
| Channel Step | Distance to next Channel (bytes) | |
| Image Source | Data pointer to Image | 64 |
| Origin | 2D Origin of patch in Image | 24 |
| Buffer | 2D Buffer information | 12 |

As shown in Table 1, each entry contains: (1) an Image ID field that provides an index into the image table 440 that contains the entry that includes a data structure for the source image corresponding to the patch; (2) an Origin Offset field that provides a two-element vector for specifying an origin or anchor position for the patch relative to the upper-left pixel in the patch; (3) a Width field that provides a width of the patch, in pixels; (4) a Height field that provides a height of the patch, in pixels; (5) a Channels field that provides a number of channels per element of data associated with each coordinate location within the patch (e.g., three channels for RGB data, four channels for RGBA data, etc.); (6) a Row Step field that provides a distance to the next row, in pixels (i.e., a number of pixels per row in the source image); (7) a Column Step field that provides a distance to the next column, in bytes (i.e., a number of bytes required to store each element of data associated with each coordinate location within the patch); (8) a Channel Step field that provides a number of bytes per channel within an element of data; (9) an Image Source field that provides a full memory address pointer (e.g., 64 bits) to the source image in the memory; (10) an Origin field that provides a two-element vector (e.g., <x, y>, etc.) for specifying an origin of the upper-left pixel for the patch relative to an origin of the source image; and (11) a Buffer field that provides information related to a 2D buffer associated with the patch. In one embodiment, the patch table 424 is 256 bytes large and each entry in the patch table 424 is 32 bytes wide, allowing for eight entries in the patch table 424. It will be appreciated that the structure of an entry in the patch table 424 shown in Table 1 is illustrative and that other data structures for representing a patch are contemplated as being within the scope of the present disclosure.

The patch LD/ST unit 422 is configured to decode commands received from the patch access unit 416. The commands include an opcode that specifies the type of operation to be performed (e.g., load patch, store patch, etc.) and an operand that specifies an index into the patch table 424 that identifies an entry in the patch table 424 for the patch corresponding to the command. The patch LD/ST unit 422 reads any required information to execute the operation from the patch table 424 and transmits a request to the tile cache 450 for performing the corresponding operation.

Tensors may be supported within the patch table 424 by including vectors in some of the fields in each entry of the patch table 424. For example, vectors may be included in the Image ID field, Image Source field, and Origin field that include different data for each patch in the collection of patches for the tensor. Alternatively, a tensor may be associated with a group of entries in the patch table 424, such that each entry in the group of entries corresponds to a patch in the collection of patches for the tensor. For example, the collection of patches in each tensor includes four patches, then a 256 byte patch table 424 having eight patch entries of 32 bytes may be divided into a first tensor entry corresponding to the first four patch entries of the patch table 424 and a second tensor entry corresponding to the last four patch entries of the patch table 424. Of course, the patch table 424 can be made larger or smaller to incorporate more or less entries within the patch table 424.

As shown in FIG. 4C, the patch unit 420 also includes a patch shift engine 426. The patch shift engine 426 enables single instructions that shift the location of a patch relative to an origin of the source image. The patch shift engine 426 is useful for certain algorithms such as image searching algorithms where a patch of one image is compared to many different patches in another image to find the closest matching patch. The patch shift engine 426 simply changes the value of the Origin field for a particular patch in the patch table 424 and then transmits a request to patch LD/ST unit 422 to load the shifted patch. The patch LD/ST unit 422 then fetches the new data from the patch table 424 and causes the tile cache 450 to load any tiles associated with the new patch. It will be appreciated that many times, shifting a patch by a few pixels may not cause the shifted patch to overlap any new tiles. Thus, the tiles associated with the shifted patch may already be loaded into the tile cache 450 and no new data will need to be fetched from the memory 240. Alternatively, even if the shifted patch overlaps one or more new tiles, many times at least some of the tiles overlapped by the shifted patch are already in the tile cache 450 and only the new overlapped tiles will need to be fetched from the memory 240. In summary, a single instruction causes the patch to be redefined in the patch table 424 and any new data associated with the patch is automatically fetched into the tile cache 450 so that the data may be utilized by one or more VPUs 210.

Figure 4D:
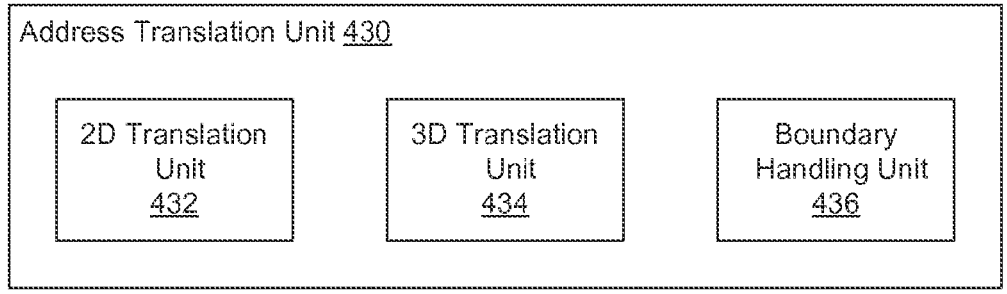
FIG. 4D illustrates the address translation unit of FIG. 4A, in accordance with one embodiment.

FIG. 4D illustrates the address translation unit 430 of FIG. 4A, in accordance with one embodiment. The address translation unit 430 includes a 2D translation unit 432, a 3D translation unit 434, and a boundary handling unit 436.

The 2D translation unit 432 generates memory addresses based on a two-element vector, such as an <x, y> pixel coordinate location. In one embodiment, the 2D translation unit 432 is configured to calculate addresses for one of the images represented by an entry in the image table 440. For example, a register associated with the 2D translation unit 432 may store an index that identifies an entry in the image table 440. In one embodiment, each entry in the image table 440 contains the information listed in Table 2.

TABLE 2

| Field | Use | Bits |
|---|---|---|
| Width | Image Width (px) | 12 |
| Height | Image Height (px) | 12 |
| Channels | Number of Channels | 3 |
| Row Step | Distance to next Row (px) | 12 |
| Column Step | Distance to next Column (bytes) | 5 |
| Channel Step | Distance to next Channel (bytes) | 3 |
| Image Source | Data pointer to Image | 64 |

As shown in Table 2, each entry contains: (1) a Width field that provides a width of the image, in pixels; (2) a Height field that provides a height of the image, in pixels; (3) a Channels field that provides a number of channels per element of data associated with each coordinate location within the image (e.g., three channels for RGB data, four channels for RGBA data, etc.); (4) a Row Step field that provides a distance to the next row, in pixels (i.e., a number of pixels per row in the image); (5) a Column Step field that provides a distance to the next column, in bytes (i.e., a number of bytes required to store each element of data associated with each coordinate location within the patch); (6) a Channel Step field that provides a number of bytes per channel within an element of data; and (7) an Image Source field that provides a full memory address pointer (e.g., 64 bits) to the source image in the memory. In one embodiment, the image table 440 is 512 bytes large and each entry in the image table 440 is 16 bytes wide, allowing for 32 entries in the image table 440. It will be appreciated that the structure of an entry in the image table 440 shown in Table 2 is illustrative and that other data structures for representing an image are contemplated as being within the scope of the present disclosure.

As the 2D translation unit 432 receives a two-element vector specifying a pixel location in the image, the 2D translation unit may calculate an address for the pixel based on an entry in the image table 440. For example, the 2D address translation unit 432 may multiply the y coordinate value in the two-element vector by the value stored in the Row Step field of the corresponding entry in the image table 440 and add the result to the x coordinate value in the two-element vector to generate an intermediate value. The intermediate value represents an offset for the pixel corresponding to the two-element vector, in a number of pixels, where the pixels of the image are stored in consecutive addresses in row-major order. Then, the 2D address translation unit 432 may multiply the intermediate value by the value stored in the Column Step field of the corresponding entry in the image table 440 to generate an offset, in bytes, for the pixel relative to an origin of the image source. This offset is then added to the value stored in the Image Source field of the corresponding entry in the image table 440 to generate the memory address for the pixel corresponding to the two-element vector.

It will be appreciated that the 2D translation unit 432 may be configured to generate memory addresses for multiple pixel locations in the same image very quickly, with each pixel location associated with a different two-element vector that includes the pixel location coordinates relative to the image. In contrast, the 3D translation unit 434 performs a similar operation using a three-element vector. The 3D translation unit 434 may generate addresses in a similar fashion to the 2D translation unit 432 using two of the elements in the three-element vector. However, the third element in the three-element vector may be used to specify a different entry in the image table 440 for each memory address. Thus, the 3D translation unit 434 may be utilized to quickly generate a memory address for multiple pixel locations in multiple images very quickly, where each three-element vector contains, e.g., an x coordinate value, a y coordinate value, and an index into the image table 440.

Other types of translation units are contemplated as being within the scope of the present disclosure. For example, a 4D translation unit that generates a memory address based on a four-element vector is contemplated for, e.g., translating addresses associated with voxel locations in a volumetric image.

The boundary handling unit 436 enables another aspect of the patch memory system 220. Many image processing algorithms require special handling of certain pixels near the borders of an image. For example, a 5×5 convolution window may require special handling for pixel values that lie outside the image borders when the center pixel of the convolution window falls within two rows or two columns of the image border. In one case, the pixels that fall outside of the image border may be replaced with pixels copied from the nearest adjacent pixel inside the image border. In another case, the pixels that fall outside the image border may be replaced with a mirror image of the pixels inside the image border. In yet another case, the pixels that fall outside the image border may be replaced with a default pixel. Special rules may be determined for handling these special cases. The boundary handling unit 436 is configured to use a function to determine the proper value to return. This function may be a constant, a function of the pixels in the image, or other pixels within the image. In one embodiment, the function automatically returns an address for a pixel within the image in response to receiving a vector that specifies a pixel coordinate location that falls outside the image border according to the pre-configured rules. In other words, in one embodiment, if a memory address for a pixel coordinate location outside the image border is requested, the boundary handling unit 436 will automatically calculate a corresponding pixel coordinate location inside the image border as the memory address. In another embodiment, if a memory address for a pixel coordinate location outside the image border is requested, the boundary handling unit 436 simply returns a constant value in response to the memory address request.

Figure 4E:
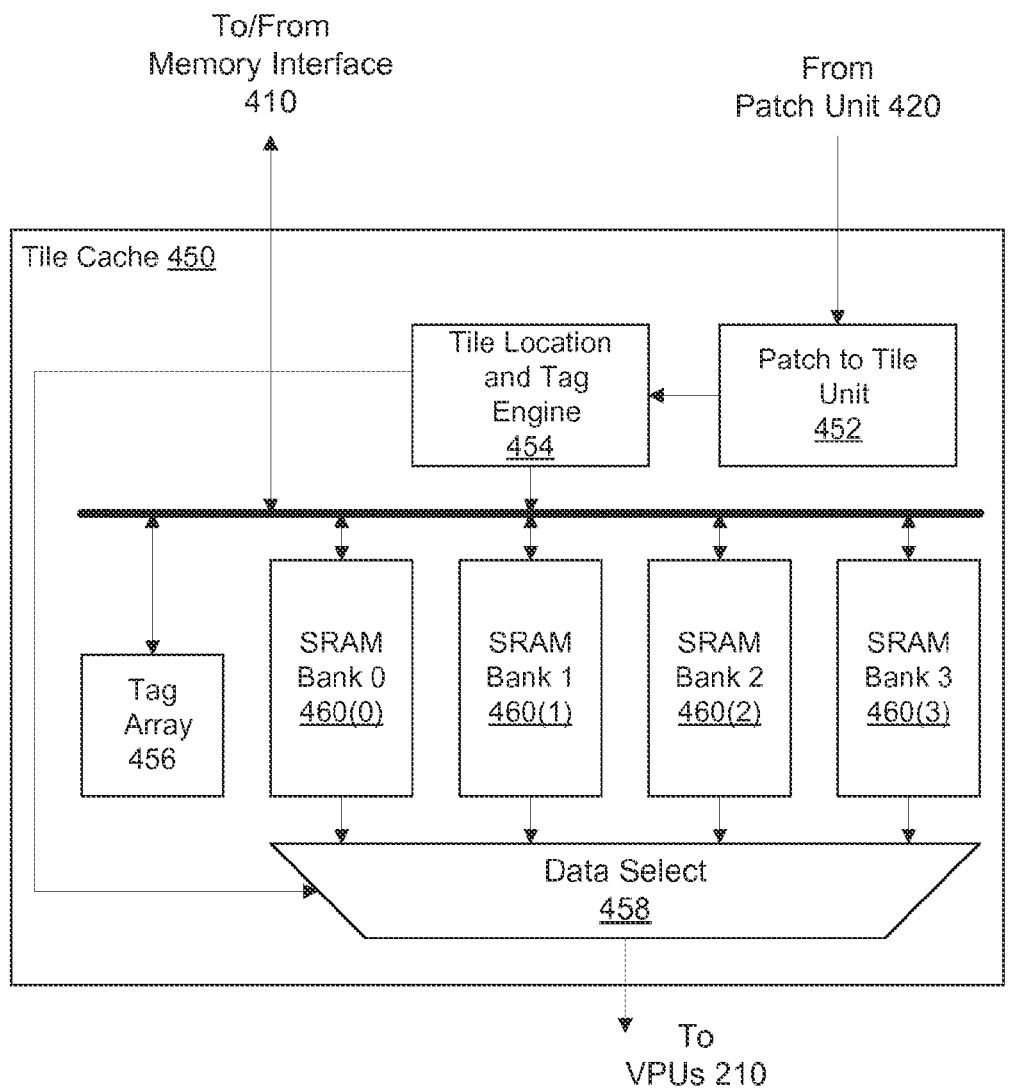
FIG. 4E illustrates the tile cache of FIG. 4A, in accordance with one embodiment.

FIG. 4E illustrates the tile cache 450 of FIG. 4A, in accordance with one embodiment. The tile cache 450 includes a patch-to-tile unit 452, a tile location and tag engine 454, a tag array 456, a data select unit 458, and one or more SRAM banks 460. In one embodiment, the tile cache 450 includes four SRAM banks 460.

The patch-to-tile unit 452 receives a request from the patch LD/ST unit 422 related to a particular patch. For example, the patch LD/ST unit 422 may transmit a request to the patch-to-tile unit 452 to load a patch into the tile cache 450. The request may include the Image Source field, the Origin field, the Origin Offset field, the Width field, and the Height field for the patch. The patch-to-tile unit 452 may then identify which tiles in the image specified by the Image Source field are associated with (i.e., intersected by) the patch based on the location and size of the patch in the image. The patch-to-tile unit 452 then transmits the tile information to the tile location and tag engine 454.

The tile location and tag engine 454 determines the location of the specified tiles for the patch and then checks the tag array 456 to determine whether the tiles are stored locally in the SRAM banks 460. If a tag associated with a tile is included in the tag array 456, then the tile cache 450 may not need to fetch the tile from memory 240 into the SRAM banks 460. However, if the tag associated with a tile is not included in the tag array 456, then the tile cache 450 may add the tag to the tag array 456 and fetch the data for the tile from the memory 240 and store the data in the SRAM banks 460.

The tile location and tag engine 454 may also control the data select unit 458. The data select unit 458 may reorder data from the SRAM banks 460 to be delivered to the VPUs 210. For example, the data select unit 458 may enable swizzling such that rows of data or columns of data can be retrieved from multiple SRAM banks 460 in a single clock cycle.

Figure 5A:
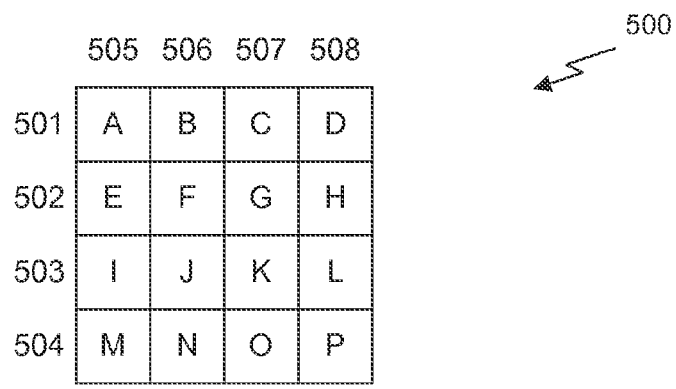
FIG. 5A illustrates a tile of a digital image, in accordance with one embodiment.

FIG. 5A illustrates a tile 500 of a digital image, in accordance with one embodiment. The tile 500 includes four rows of pixel data and four columns of pixel data. The first row of pixel data 501 includes pixels A, B, C, and D; the second row of pixel data 502 includes pixels E, F, G, and H; the third row of pixel data 503 includes pixels I, J, K, and L and the fourth row of pixel data 504 includes pixels M, N, O, and P. The first column of pixel data 505 includes pixels A, E, I, and M; the second column of pixel data 506 includes pixels B, F, J, and N; the third column of pixel data 507 includes pixels C, G, K, and O; and the fourth column of pixel data 508 includes pixels D, H, L, and P. It will be appreciated that a tile of a digital image may be larger than 4 pixels by 4 pixels; however, the tile 500 is shown in order to illustrate a technique for swizzling data in the SRAM banks 460 to enable efficient data access by the VPUs 210.

Figure 5B:
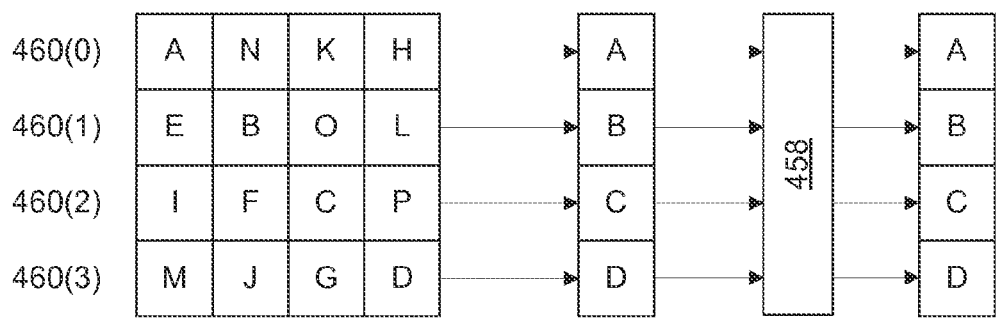
FIG. 5B illustrates a row-access swizzling operation, in accordance with one embodiment.

FIG. 5B illustrates a row-access swizzling operation, in accordance with one embodiment. As shown in FIG. 5B, the pixel data from the tile 500 is not stored in the manner the pixel data is arranged in the original image. In other words, a row of pixel data in the tile 500 is not stored across multiple SRAM banks 460 in the same row. Similarly, a column of pixel data in the tile 500 is not stored in the same SRAM bank 460. The first SRAM bank 460(0) stores the pixel data for pixels A, N, K, and H; the second SRAM bank 460(1) stores the pixel data for pixels E, B, O, and L; the third SRAM bank 460(2) stores the pixel data for pixels I, F, C, and P; and the fourth SRAM bank 460(3) stores the pixel data for pixels M, J, G, and D. By storing the pixel data across the SRAM banks 460 in this manner, the data select 458 may quickly retrieve rows of pixel data in a single clock cycle.

For example, to retrieve the first row of pixel data 501 from the tile 500, the data select 458 may retrieve the pixel data for pixel A from the first SRAM bank 460(0), the pixel data for pixel B from the second SRAM bank 460(1), the pixel data for pixel C from the third SRAM bank 460(2), and the pixel data for pixel D from the fourth SRAM bank 460(3). The first row of pixel data 501 is therefore retrieved in a single clock cycle. In contrast, if the first row of pixel data was stored in a single SRAM bank 460, then the first row of pixel data 501 could only be retrieved over multiple clock cycles.

Figure 5C:
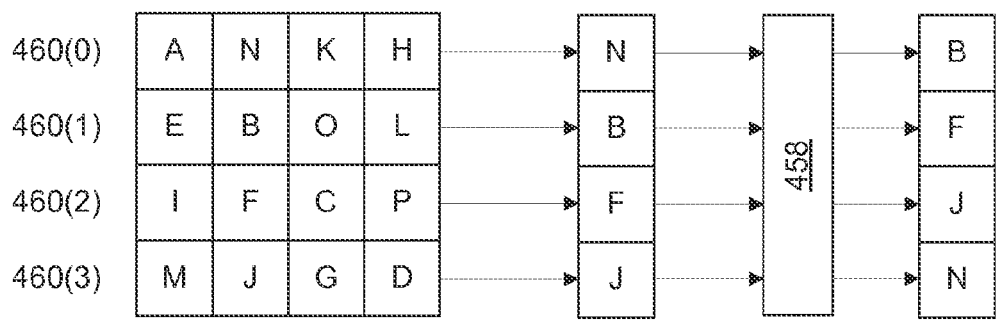
FIG. 5C illustrates a column-access swizzling operation, in accordance with one embodiment.

FIG. 5C illustrates a column-access swizzling operation, in accordance with one embodiment. As shown in FIG. 5C, by storing the pixel data across the SRAM banks 460 in this manner, the data select 458 may also quickly retrieve columns of pixel data. For example, to retrieve the second column of pixel data 506 from the tile 500, the data select 458 may retrieve the pixel data for pixel N from the first SRAM bank 460(0), the pixel data for pixel B from the second SRAM bank 460(1), the pixel data for pixel F from the third SRAM bank 460(2), and the pixel data for pixel J from the fourth SRAM bank 460(3). The data select 458 may then reorder the data such that the pixel data is transmitted in column-order, shown as B, F, J, and N. The second column of pixel data 506 is therefore retrieved in a single clock cycle. In contrast, if the first column of pixel data was stored in a single SRAM bank 460, then the second column of pixel data 506 could only be retrieved over multiple clock cycles.

The swizzling operations shown in FIGS. 5B and 5C enable efficient access to the pixel data included in a tile 500. Although a 4×4 pixel tile is shown in FIG. 5A, larger tiles may be supported by similar operations, for example, an 8×8 pixel tile could be supported by storing two pixels from every row and two pixels from every column in each of the four SRAM banks 460. Instead of retrieving an entire row or column of the tile in a single clock cycle, the row or column could be retrieved in two clock cycles. Alternatively, the number of SRAM banks could be increased to match the number of pixels in a row or column of the tile in order to access an entire row or column of the tile in a single clock cycle.

Figure 6A:
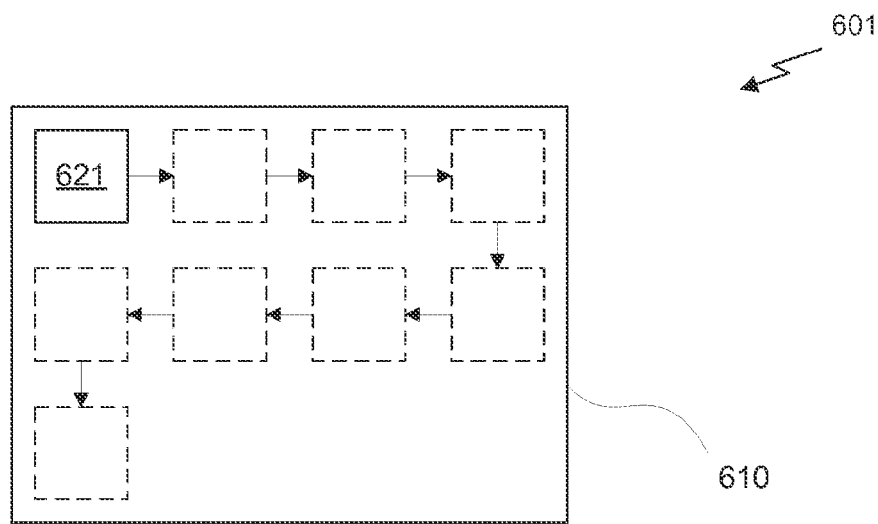
FIGS. 6A-6C illustrate various shift patterns implemented by the patch shift engine of the patch unit, in accordance with on embodiment.
Figure 6B:
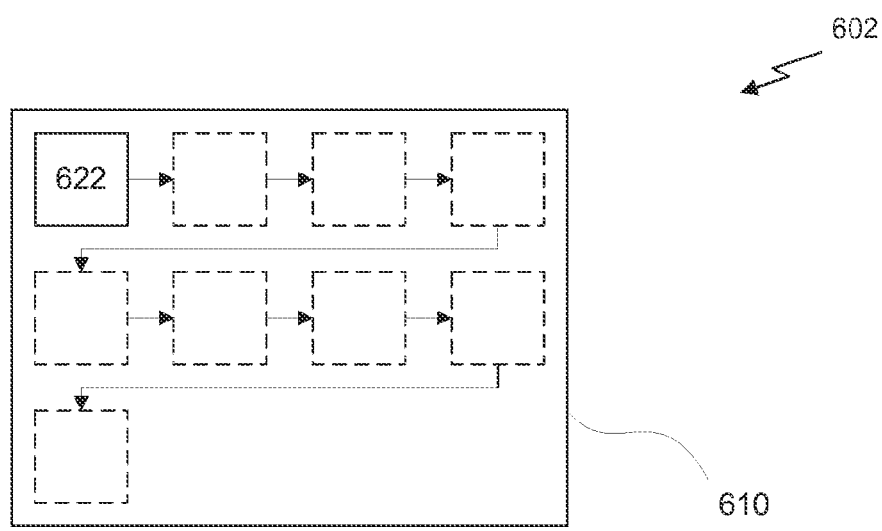
Figure 6C:
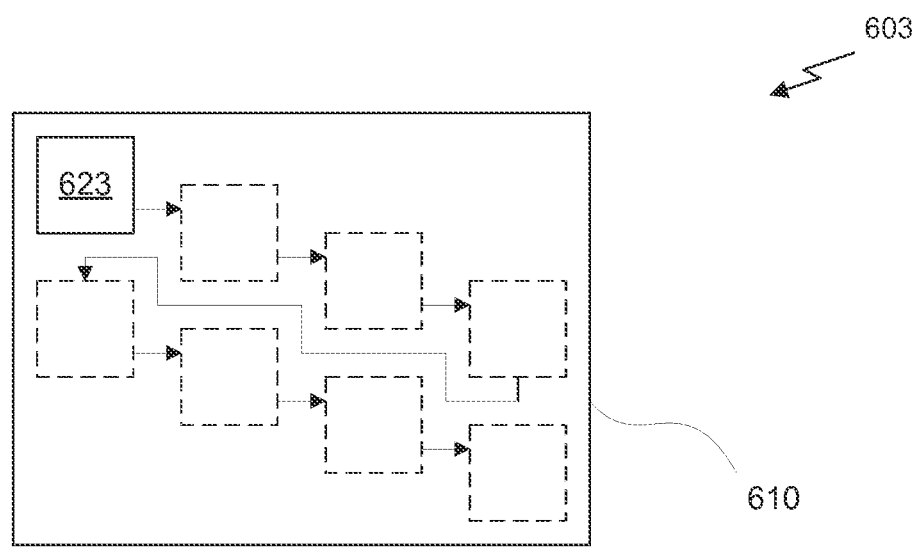

FIGS. 6A-6C illustrate various shift patterns implemented by the patch shift engine 426 of the patch unit 420, in accordance with one embodiment. The patch shift engine 426 enables the patch memory system 220 to implement patch shift operations. Importantly, a patch shift operation efficiently fetches only the data in a shifted patch that is not already resident in the tile cache 450. The patch shift operation allows the local memory to facilitate a rolling buffer to support sliding window operations. The shift patterns implemented by the patch shift engine 426 can be set to follow common patterns used in many computer vision and image processing applications.

In one embodiment, the patch shift engine 426 can be configured to automatically shift a patch according to a particular shift pattern based on a single instruction. As shown in FIG. 6A, a first shift pattern 601 may be referred to as a sliding window trace pattern. A patch 621 is defined in the patch table 424, the definition including an origin, a height, and a width. The patch shift engine 426 may be configured to automatically shift the location of the patch 621 in response to the instruction. In one embodiment, the patch shift engine 426 may be configured to automatically implement a particular shift pattern, such as the sliding window trace pattern. In response to the instruction, the patch shift engine 426 may increment the value(s) stored in the Origin field of the patch table for the particular patch to translate the patch to a new location in the image. For example, the patch shift engine 426 may increment an x coordinate value in the Origin field by a horizontal step amount to move the patch horizontally across the image. If the translation would cause the patch to fall outside the image boundary, then the patch shift engine 426 may instead increment a y coordinate value in the Origin field by a vertical step amount to move the patch vertically down the image. The horizontal step amount may then be decremented from the x coordinate value during each shift to translate the patch back across the image 610. This process is continued until the patch has traversed the entirety of the image 610.

The horizontal and vertical step sizes may be chosen arbitrarily to match a particular algorithm. As shown in FIG. 6A, the step sizes can be larger than the width and height of the patch such that shifted patches do not overlap. Alternatively, the step sizes can be smaller than the width and height of the patch such that the shifted patches overlap. For example, a step size of 1 pixel for both the horizontal step and the vertical step will cause the sliding window trace pattern to eventually load every possible patch of a given size in the image 610.

Other shift patterns are contemplated as being within the scope of the patch shift engine 426. As shown in FIG. 6B, a second shift pattern 602 may be referred to as a sliding window Z pattern. The sliding window Z pattern is similar to the sliding window trace pattern except when the patch 622 reaches the end of a row in the image, they coordinate value is incremented by the vertical step amount and the x coordinate value is returned to the initial x coordinate value. In other words, instead of reversing the direction of traversal of the patch 622 back across the image 610, the shift pattern for the first row of patches in the image 610 is simply repeated for the next row of patches in the image 610.

As shown in FIG. 6C, a third shift pattern 603 may be referred to as a sliding window diagonal pattern. The sliding window diagonal pattern is similar to the sliding window Z pattern except that both the x coordinate value and the y coordinate value are incremented by the horizontal step amount and the vertical step amount, respectively, during each shift operation. Thus, the patch 623 moves diagonally across the image 610. The process is then repeated for the next row of the image 610. Although not shown explicitly in FIG. 6C, the diagonal path may also be repeated across the columns of the image such that diagonal paths to the right of the first diagonal path may also be traversed.

Although FIGS. 6A-6C illustrate three common shift patterns that may be implemented by the patch shift engine 426, it will be appreciated that other shift patterns are within the scope of the present disclosure. For example, a shift pattern may incorporate repeated two-dimensional shifts across the image, where the patch is first shifted to the right a horizontal step amount, shifted down a vertical step amount, and then shifted left a horizontal step amount to form a square pattern. After the initial square pattern is finished, the patch may be positioned at the next location by shifting the patch up a vertical step amount and to the right two horizontal step amounts to begin the next square pattern. Other algorithms may implement other types of patterns as well.

In one embodiment, the patch shift engine 426 includes hard-wired logic that implements one or more of the shift patterns as a fixed function shift operation. In other words, the instruction includes an opcode that specifies a particular hard-coded shift pattern to be applied to a patch, indicated by an operand that specifies an index for the patch in the patch table 424. The horizontal and vertical step amounts may be hardwired, may be programmable via a special register, or read as operands to an instruction. In another embodiment, the patch shift engine 426 may be a programmable unit that can implement any arbitrary shift pattern specified by a program. For example, the program may comprise a plurality of shift vectors that specify a two-dimensional translation to apply to the patch in response to receipt of the instruction. The programmable nature of the patch shift engine 426 enables a programmer to specify any arbitrary shift pattern required for a specific application, and may also enable the shift pattern to be changed dynamically during execution.

Figure 7:
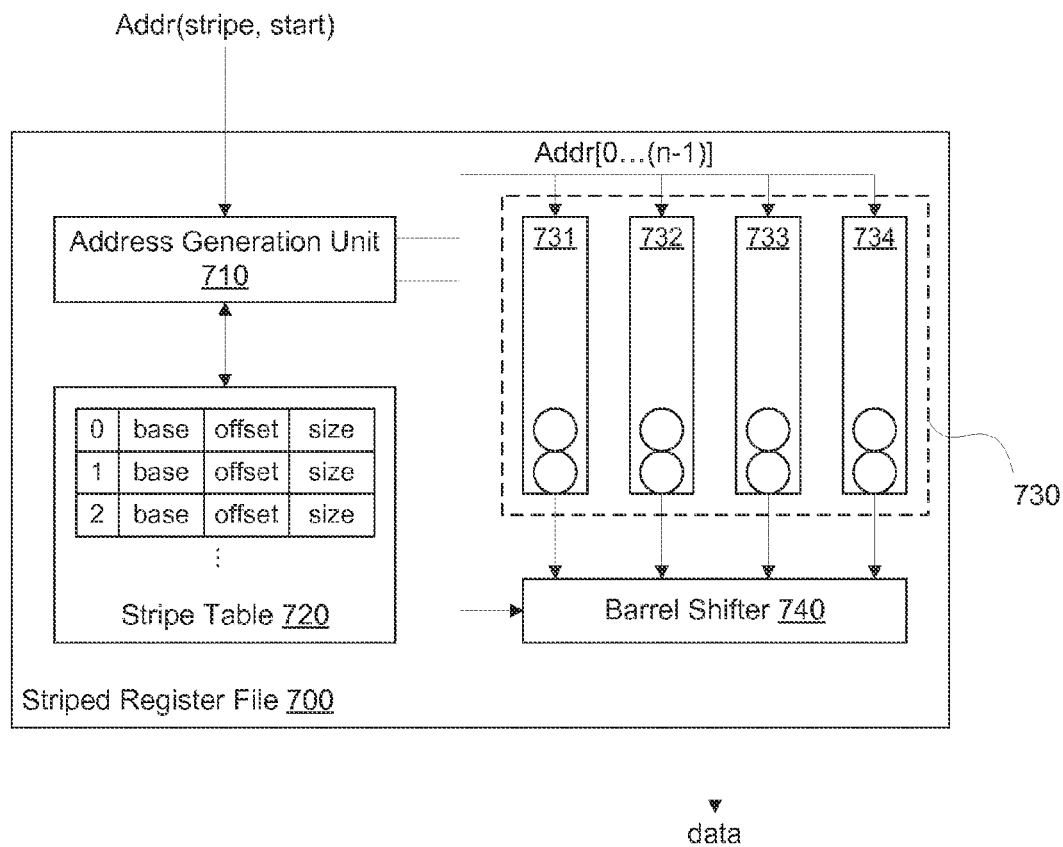
FIG. 7 illustrates a striped register file, in accordance with one embodiment.

FIG. 7 illustrates a striped register file 700, in accordance with one embodiment. The striped register file 700 may be included in each VPU 210. The striped register file 700 stores immediate values needed to be processed by the lanes of the VPU 210. For example, once a tile of image data is loaded into the patch memory system 220, subsets of data from the tile may be loaded into the striped register file 700 of the VPUs 210 to provide that data to the compute engines for processing.

In one embodiment, each processing engine of the VPU 210 may be configured to perform an operation on a different patch. For example, a plurality of 5×5 patches may be defined that are used to implement a convolution filter for an image. Each processing engine of the VPU 210 may be tasked with computing a filtered value based on a different 5×5 patch. In a conventional vector register file, a first register may store data for a first pixel corresponding to each patch, a second register may store data for a second pixel corresponding to each patch, and so on. In other words, each register stores a single data element for the N lanes of the VPU 210. Thus, a particular register address may be used to select data for a corresponding pixel in each of the N patches being processed by the N lanes of the VPU 210 in parallel.

However, in practice, patches will typically overlap and, therefore, data for the same pixel will be stored in multiple registers corresponding to the relative location of the pixel in the different patches. For example, if patches are offset by a single pixel, the third pixel in the first row of the first patch is also the second pixel in the first row of the second patch and the first pixel in the first row of the third patch. Thus, the data for the pixel may be stored redundantly in three different registers of the vector register file in order for three different lanes of the VPU 210 to access the data.

The redundant storage requirements lead to a larger register file that takes more power to operate than a smaller register file. For example, in the case of four 5×5 pixel patches having a one pixel offset, there will be a total of 40 pixels (i.e., 5×5+5+5+5=40). However, each lane of the VPU 210 will require data for 25 pixels, meaning the register file must hold the data for 100 pixels (i.e., 4×5× 5=100). Thus, there would be 60% redundant data storage in the register file. In order to solve the issue related to redundant storage, a data access abstraction in the register file may be implemented.

As shown in FIG. 7, the striped register file 700 includes an address generation unit 710, a stripe table 720, N memory banks 730, and a barrel shifter 740. A "stripe" refers to a set of data to be accessed by all four VPUs 210. In one implementation, a stripe of data may refer to pixel data included in a horizontal row of pixel data included in N patches. Each row of pixel data in one of the N patches may be included in a different stripe. Each stripe of data is stored in N memory banks 730. It will be appreciated that the same pixel will never have the same pixel coordinate location relative to an origin for the different patches. Therefore, care can be taken to store pixel data in the N memory banks 730 in a manner that the pixel data for the same pixel coordinate location in different patches is stored in different memory banks 730.

Figure 8A:
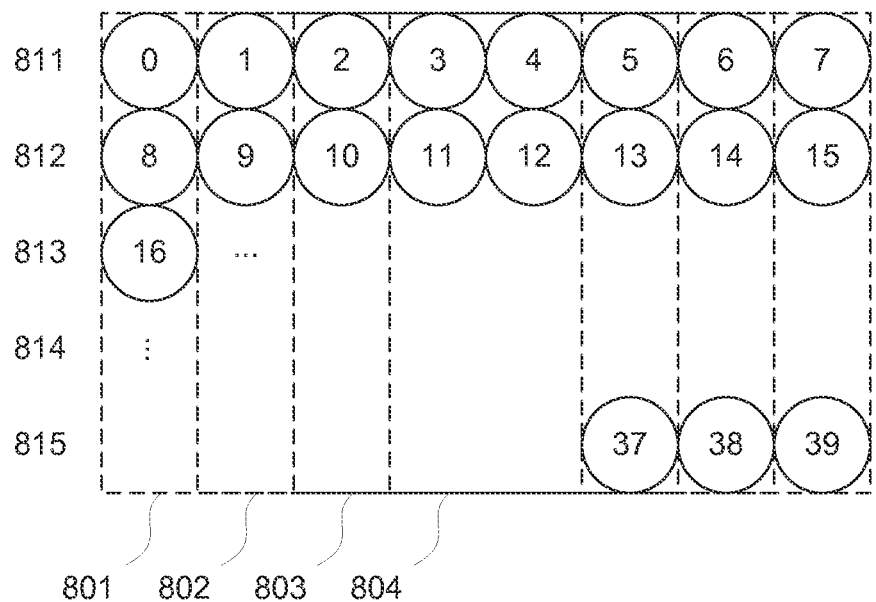
FIG. 8A illustrates four patches offset by a single pixel, in accordance with one embodiment.

FIG. 8A illustrates four patches offset by a single pixel, in accordance with one embodiment. As shown in FIG. 8A, a first row 811 of a first patch 801 includes pixels 0, 1, 2, 3, and 4; a first row 811 of a second patch 802 includes pixels 1, 2, 3, 4, and 5; a first row 811 of a third patch 803 includes pixels 2, 3, 4, 5, and 6; and a first row 811 of a fourth patch 804 includes pixels 3, 4, 5, 6, and 7. The pixels 8-39 are included in the second through fifth rows (i.e., rows 812, 813, 814, and 815) of the patches.

Figure 8B:
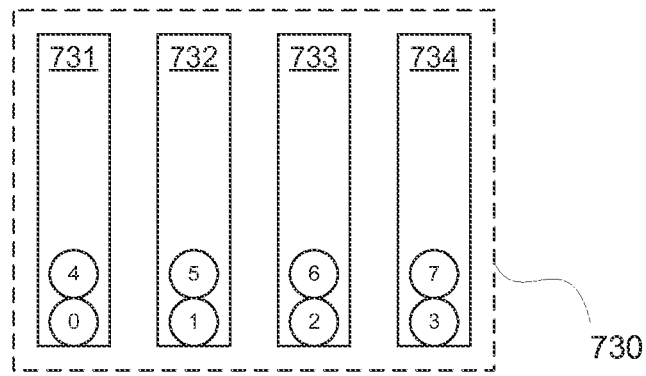
FIG. 8B illustrates the storage of a first stripe of pixel data associated with the four patches of FIG. 8A, in accordance with one embodiment.

FIG. 8B illustrates the storage of a first stripe of pixel data associated with the four patches of FIG. 8A, in accordance with one embodiment. A "stripe", as used herein, refers to a logical arrangement of data in the striped register file 700 corresponding to one or more patches. In one embodiment, a stripe may refer to all the pixel data for one or more patches corresponding to a particular row relative to each of the patches. In another embodiment, a stripe may refer to every $n^{th}$ pixel in a particular row relative to each of the patches (e.g., data corresponding to "even" pixels is stored in a first stripe and data corresponding to "odd" pixels is stored in a second stripe, etc.).

As shown in FIG. 8B, a first stripe of pixel data associated with the four patches includes pixels 0-7 across the first row 811 of the four patches. Pixels 0 and 4 are stored in a first memory bank 731, pixels 1 and 5 are stored in a second memory bank 732, pixels 2 and 6 are stored in a third memory bank 733, and pixels 3 and 7 are stored in a fourth memory bank 734. It will be appreciated that the pixels located at index <0, 0> relative to a particular patch (i.e., the upper left pixel in the patch) are stored in different memory banks (i.e., pixel 0 is stored in the first memory bank 731, pixel 1 is stored in the second bank 732, pixel 2 is stored in the third memory bank 733, and pixel 3 is stored in the fourth memory bank 734). Similarly, the pixels located at the index <0, 1> relative to a particular patch (i.e., the second pixel in the first row of the patch) are stored in different memory banks (i.e., pixel 1 is stored in the second bank 732, pixel 2 is stored in the third memory bank 733, pixel 3 is stored in the fourth memory bank 734, and pixel 4 is stored in the first memory bank 731 etc.).

Figure 8C:
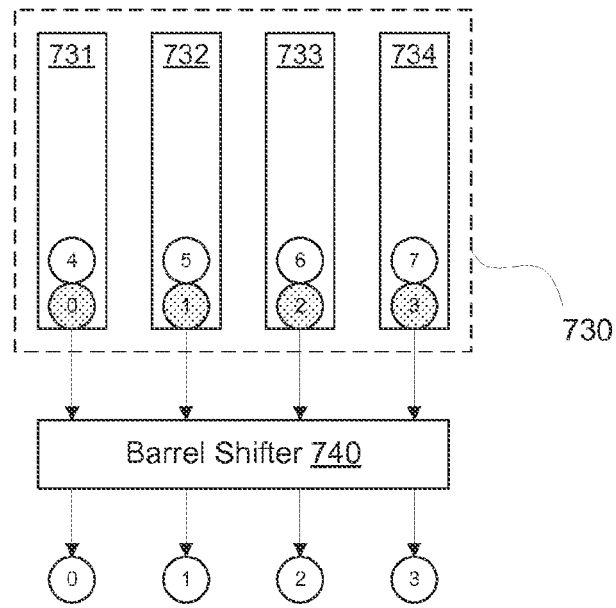
FIGS. 8C-8D illustrate the operation of the barrel shifter of FIG. 7, in accordance with one embodiment.
Figure 8D:
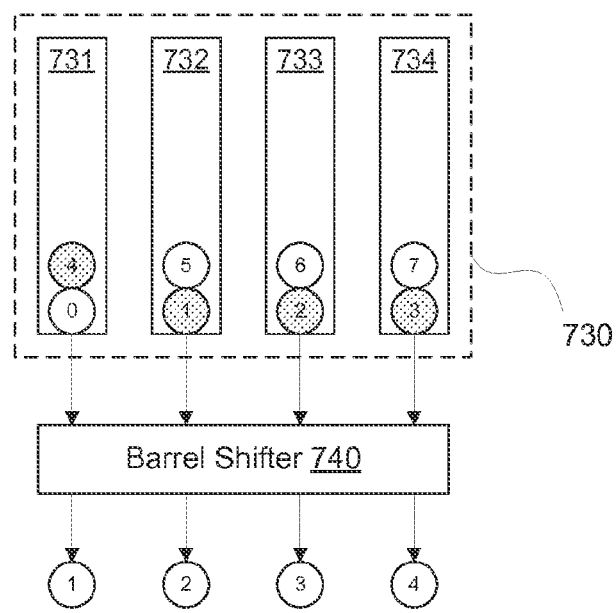

FIGS. 8C-8D illustrate the operation of the barrel shifter 740 of FIG. 7, in accordance with one embodiment. Again, in a conventional vector register file, the data utilized by a particular lane of the VPU 210 would need to be located within a particular byte(s) of the register in order to be routed to the correct lane of the VPU 210. For example, in a 32-bit compute engine, data for a first lane of the VPU 210 would be stored in the first four bytes of each of the registers, where registers are 16 bytes (128 bits) wide to store vectors for the four lanes of the VPU 210.

In contrast, the barrel shifter 740 enables data stored in any of the N memory banks 730 of the striped register file 700 to be reordered in order to be transmitted to the correct lane of the VPU 210. As shown in FIG. 8C, the first pixel in each of the four patches 801, 802, 803, and 804 may be read from each of the four memory banks 731, 732, 733, and 734, respectively, and then passed to the lanes of the VPU 210 by the barrel shifter 740. As shown, the order of the pixel data does not need to be shifted by the barrel shifter 740 due to the arrangement of the pixel data in the four memory banks 730. In contrast, as shown in FIG. 8D, the second pixel in each of the four patches 801, 802, 803, and 804 may be read from each of the four memory banks 732, 733, 734, and 731, respectively, and then passed to the lanes of the VPU 210 by the barrel shifter 740. In this case, the barrel shifter 740 adjusts the order of the data such that pixel data for pixel 1 stored in the second memory bank 732 is transmitted to the first lane of the VPU 210, pixel data for pixel 2 stored in the third memory bank 733 is transmitted to the second lane of the VPU 210, pixel data for pixel 3 stored in the fourth memory bank 734 is transmitted to the third lane of the VPU 210, and pixel data for pixel 4 stored in the first memory bank 731 is transmitted to the fourth lane of the VPU 210.

Figure 8E:
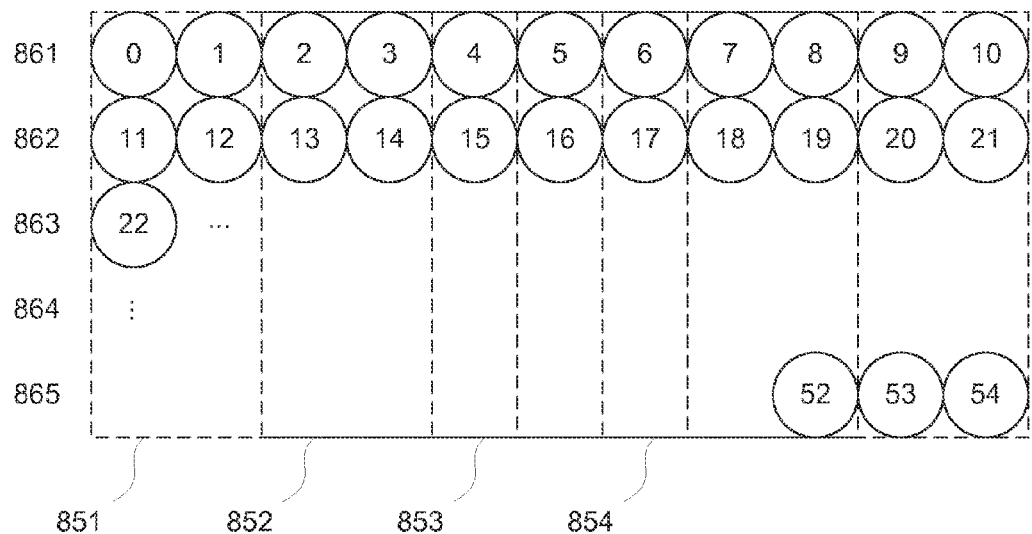
FIG. 8E illustrates four patches offset by two pixels, in accordance with another embodiment.

FIG. 8E illustrates four patches offset by two pixels, in accordance with another embodiment. As shown in FIG. 8E, a first row 861 of a first patch 851 includes pixels 0, 1, 2, 3, and 4; a first row 861 of a second patch 852 includes pixels 2, 3, 4, 5, and 6; a first row 861 of a third patch 853 includes pixels 4, 5, 6, 7, and 8; and a first row 861 of a fourth patch 854 includes pixels 6, 7, 8, 9, and 10. The pixels 11-54 are included in the second through fifth rows (i.e., rows 862, 863, 864, and 865) of the patches.

Figure 8F:
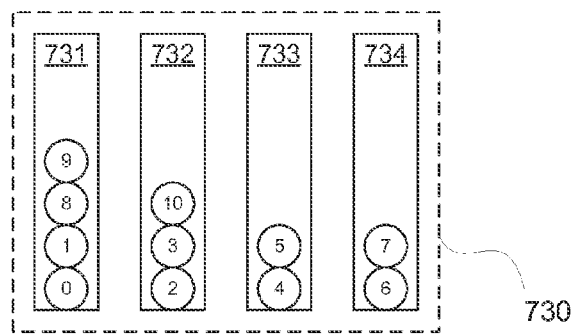
FIG. 8F illustrates the storage of a first stripe of pixel data associated with the four patches of FIG. 8E, in accordance with one embodiment.

FIG. 8F illustrates the storage of a first stripe of pixel data associated with the four patches of FIG. 8E, in accordance with one embodiment. The first stripe of pixel data associated with the four patches includes pixels 0-10 across the first row 861 of the four patches. As shown in FIG. 8F, pixels 0, 1, 8, and 9 are stored in a first memory bank 731, pixels 2, 3, and 10 are stored in a second memory bank 732, pixels 4 and 5 are stored in a third memory bank 733, and pixels 6 and 7 are stored in a fourth memory bank 734. It will be appreciated that the pixels located at index <0, 0> relative to a particular patch (i.e., the upper left pixel in the patch) are stored in different memory banks (i.e., pixel 0 is stored in the first memory bank 731, pixel 2 is stored in the second bank 732, pixel 4 is stored in the third memory bank 733, and pixel 6 is stored in the fourth memory bank 734). Similarly, the pixels located at the index <0, 1> relative to a particular patch (i.e., the second pixel in the first row of the patch) are stored in different memory banks (i.e., pixel 1 is stored in the first memory bank 731, pixel 3 is stored in the second memory bank 732, pixel 5 is stored in the third memory bank 733, and pixel 7 is stored in the fourth memory bank 734). Similarly, the pixels located at the index <0, 2> relative to a particular patch (i.e., the third pixel in the first row of the patch) are stored in different memory banks (i.e., pixel 2 is stored in the second bank 732, pixel 4 is stored in the third memory bank 733, pixel 6 is stored in the fourth memory bank 734, and pixel 8 is stored in the first memory bank 731).

Figure 8G:
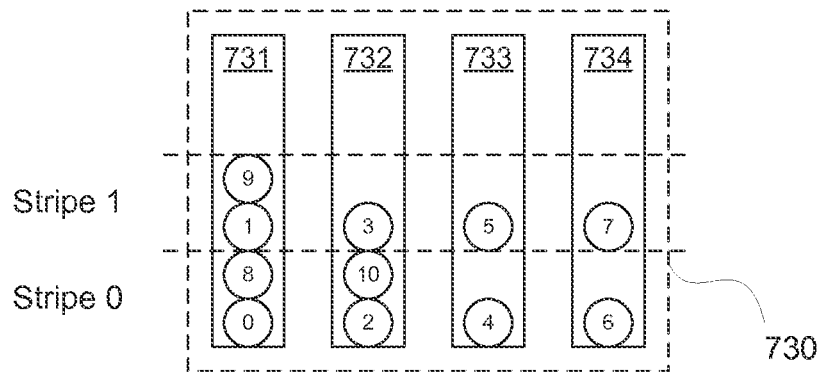
FIG. 8G illustrates the storage of two stripes of pixel data associated with the four patches of FIG. 8E, in accordance with another embodiment

FIG. 8G illustrates the storage of two stripes of pixel data associated with the four patches of FIG. 8E, in accordance with another embodiment. The first stripe of pixel data (i.e., Stripe 0) associated with the four patches includes all "even" pixels (e.g., pixels 0, 2, 4, 6, 8, 10) across the first row 861 of the four patches. The second stripe of pixel data (i.e., Stripe 1) associated with the four patches includes all "odd" pixels (e.g., pixels 1, 3, 5, 7, 9) across the first row 861 of the four patches As shown in FIG. 8G, pixels 0, 1, 8, and 9 are stored in a first memory bank 731, pixels 2, 3, and 10 are stored in a second memory bank 732, pixels 4 and 5 are stored in a third memory bank 733, and pixels 6 and 7 are stored in a fourth memory bank 734. It will be appreciated that, in comparison to the single stripe arrangement of FIG. 8F, the data in a single row of the four patches is accessed using different stripe indices as stored in the stripe table 720, depending on whether the data requested is for "even" or "odd" pixels.

Figure 8H:
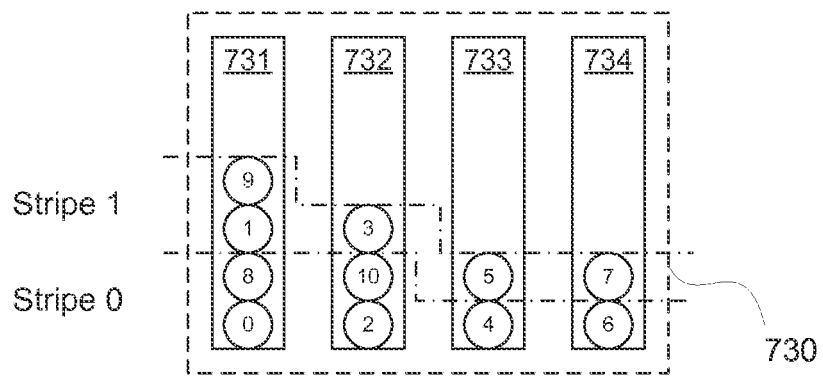
FIG. 8H illustrates the storage of two stripes of pixel data associated with the four patches of FIG. 8E, in accordance with yet another embodiment.

FIG. 8H illustrates the storage of two stripes of pixel data associated with the four patches of FIG. 8E, in accordance with yet another embodiment. Again, the first stripe of pixel data (i.e., Stripe 0) associated with the four patches includes all "even" pixels (e.g., pixels 0, 2, 4, 6, 8, 10) across the first row 861 of the four patches. The second stripe of pixel data (i.e., Stripe 1) associated with the four patches includes all "odd" pixels (e.g., pixels 1, 3, 5, 7, 9) across the first row 861 of the four patches As shown in FIG. 8H, pixels 0, 1, 8, and 9 are stored in a first memory bank 731, pixels 2, 3, and 10 are stored in a second memory bank 732, pixels 4 and 5 are stored in a third memory bank 733, and pixels 6 and 7 are stored in a fourth memory bank 734. However, in this embodiment, stripes may be associated with different base addresses in each of the memory banks rather than a single base address across all memory banks. For example, assuming the bottom register in each memory bank is R0 and the register numbers increase from the bottom to the top of the memory banks 730, the first stripe will be associated with a base address for R0 across all four memory banks. Because the length of the first stripe is equal to six pixels, two registers are filled in the first memory bank 731 and the second memory bank 732; however, only one register is filled in the third memory bank 733 and the fourth memory bank 734. Consequently, the second stripe may utilize different base addresses for each of the four memory banks, having a base address for R2 in the first memory bank 731 and the second memory bank 732 and a base address for R1 in the third memory bank 733 and the fourth memory bank 734. The stripe table 720 may include fields for a base address in each memory bank instead of a single field with one base address. This may enable more efficient use of the registers in the memory banks 730.

Figure 8I:
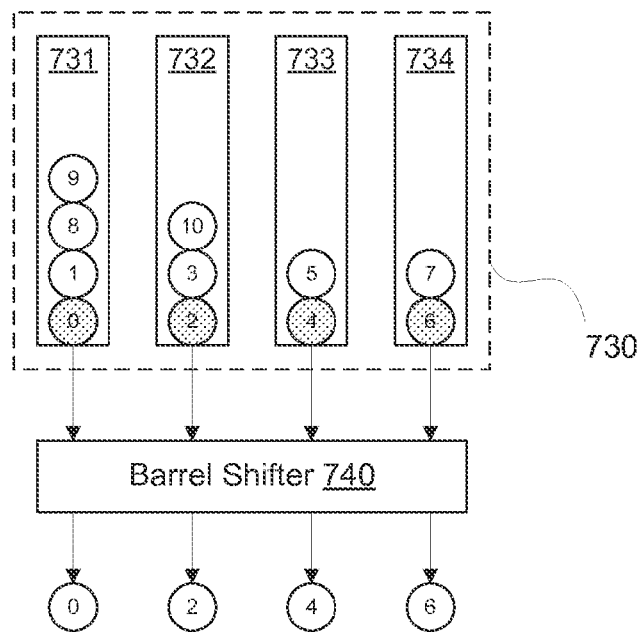
FIGS. 8I-8K illustrate the operation of the barrel shifter of FIG. 7, in accordance with another embodiment.
Figure 8J:
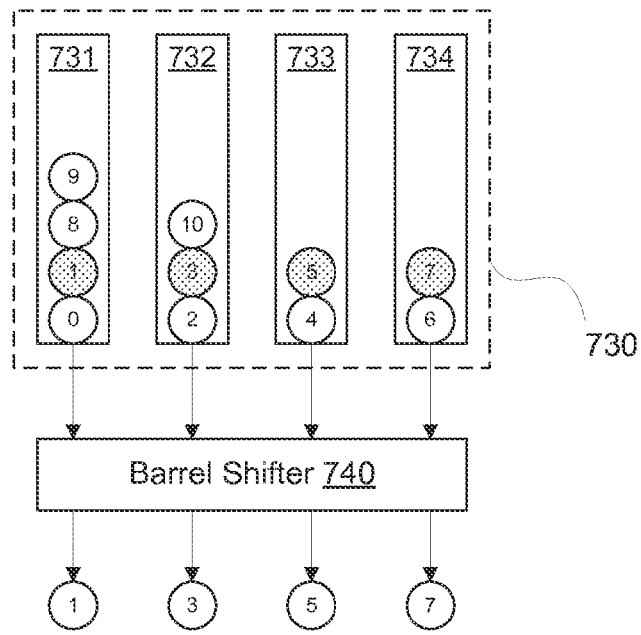
Figure 8K:
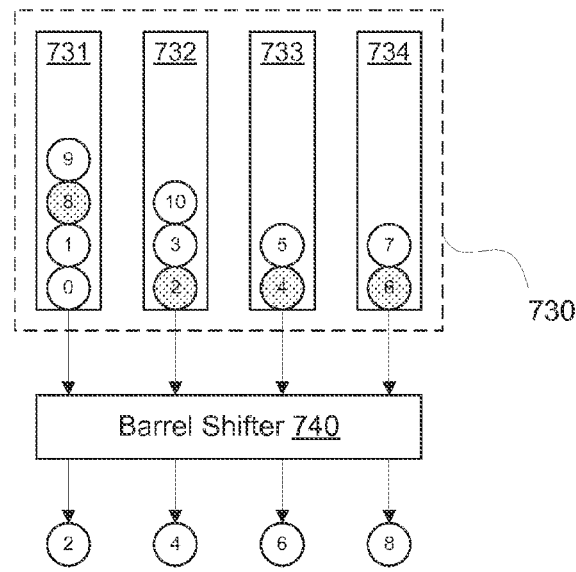

FIGS. 8I-8K illustrate the operation of the barrel shifter 740 of FIG. 7, in accordance with another embodiment. Again, the barrel shifter 740 enables data stored in any of the N memory banks 730 of the striped register file 700 to be reordered in order to be transmitted to the correct lane of the VPU 210. As shown in FIG. 8I, the first pixel (e.g., 0, 2, 4, and 6) in each of the four patches 851, 852, 853, and 854 may be read from each of the four memory banks 731, 732, 733, and 734, respectively, and then passed to the corresponding lanes of the VPU 210 by the barrel shifter 740. Similarly, as shown in FIG. 8J, the second pixel (e.g., 1, 3, 5, and 7) in each of the four patches 851, 852, 853, and 854 may be read from each of the four memory banks 731, 732, 733, and 734, respectively, and then passed to the corresponding lanes of the VPU 210 by the barrel shifter 740. As shown, the order of the pixel data for both the first and second pixel in the patches is not shifted by the barrel shifter 740 due to the arrangement of the pixel data in the four memory banks 730.

In contrast, as shown in FIG. 8K, the third pixel in each of the four patches 851, 852, 853, and 854 may be read from each of the four memory banks 732, 733, 734, and 731, respectively, and then passed to the corresponding lanes of the VPU 210 by the barrel shifter 740. In this case, the barrel shifter 740 adjusts the order of the data such that pixel data for pixel 2 stored in the second memory bank 732 is transmitted to the first lane of the VPU 210, pixel data for pixel 4 stored in the third memory bank 733 is transmitted to the second lane of the VPU 210, pixel data for pixel 6 stored in the fourth memory bank 734 is transmitted to the third lane of the VPU 210, and pixel data for pixel 8 stored in the first memory bank 731 is transmitted to the fourth lane of the VPU 210. Thus, the barrel shifter 740 connects a particular one of the memory banks 730 to a corresponding lane of the VPU 210.

Figure 8L:
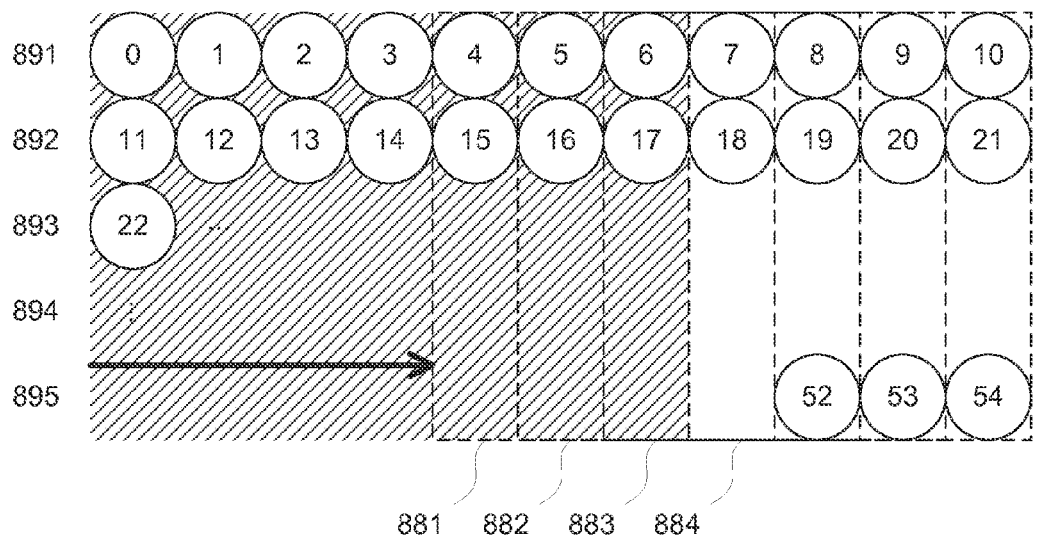
FIGS. 8L-8N illustrate the efficient management of the striped register file, in accordance with one embodiment.
Figure 8M:
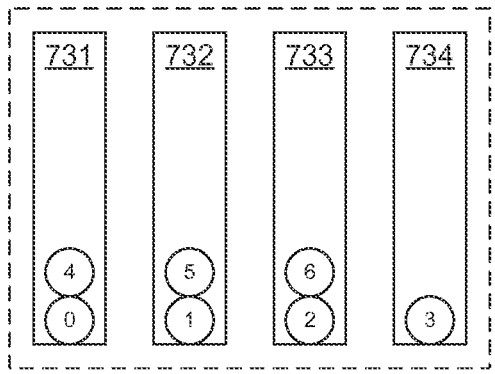
Figure 8N:
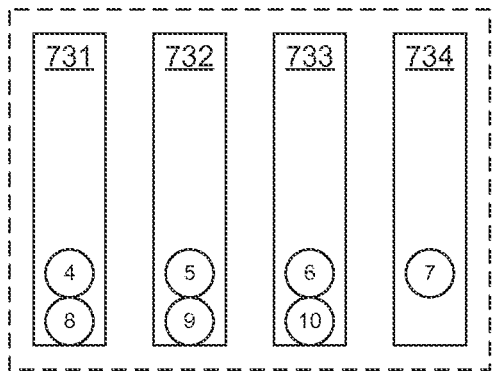

FIGS. 8L-8N illustrate the efficient management of the striped register file 700, in accordance with one embodiment. As shown in FIG. 8L, an initial position of four patches (i.e., patches 881, 882, 883, and 884) is shown as a hatched location. In other words, in an initial position, a first row 891 of a first patch 881 includes pixels 0, 1, 2, and 3; a first row 891 of a second patch 882 includes pixels 1, 2, 3, and 4; a first row 891 of a third patch 883 includes pixels 2, 3, 4, and 5; and a first row 891 of a fourth patch 884 includes pixels 3, 4, 5, and 6. After the patches have been processed, the initial position of all four patches may be shifted to the right to process a new set of pixels. After the patches have been shifted, a first row 891 of a first patch 881 includes pixels 4, 5, 6, and 7; a first row 891 of a second patch 882 includes pixels 5, 6, 7, and 8; a first row 891 of a third patch 883 includes pixels 6, 7, 8, and 9; and a first row 891 of a fourth patch 884 includes pixels 7, 8, 9, and 10.

As shown in FIG. 8M, initially the data for the first row 891 of the four patches may be stored as a stripe, where data for pixels 0-6 are stored in the stripe. Data for pixels 0 and 4 are stored in R0 and R1 of the first memory bank 731, respectively; data for pixels 1 and 5 are stored in R0 and R1 of the second memory bank 732, respectively; data for pixels 2 and 6 are stored in R0 and R1 of the third memory bank 733, respectively; and data for pixel 3 is stored in R0 of the fourth memory bank 734. When the position of the four patches is shifted, pixels 0-3 no longer overlap with the new positions of the patches, so this data can be discarded.

As shown in FIG. 8N, after the patch shift operation has shifted the positions of the four patches, the data for the first row 891 of the four patches may be stored within the stripe, while maintaining the data for pixels 4-6 that was already included in the registers allocated to the stripe. Rather than copy the data for pixels 4-6 from the current registers to new registers within the stripe, the new data for pixels 7-10 is simply added to the newly free registers in the stripe. For example, data for pixels 8 and 4 are stored in R0 and R1 of the first memory bank 731, respectively; data for pixels 9 and 5 are stored in R0 and R1 of the second memory bank 732, respectively; data for pixels 10 and 6 are stored in R0 and R1 of the third memory bank 733, respectively; and data for pixel 7 is stored in R 1 of the fourth memory bank 734. In such embodiments, the stripe table may include a field that indicates whether the stripe is filled from top down (as shown in FIG. 8N) or bottom up (as shown in FIG. 8M).

The arrangement of pixels into the different memory banks may be selected based on the offset between patches, in pixels. If there is no overlap between the patches, then there is no redundant data in the striped register file 700 and the arrangement of the data will resemble the arrangement of data in the conventional vector register file. However, where patch overlap is present, the striped register file 700 may reduce the required number of registers to store said data. In many conventional image processing algorithms, there will be significant overlap with respect to patches processed in parallel and, therefore, the striped register file 700 offers significant advantages over a conventional vector register file implementation. The smaller number of registers required in the striped register file 700 for similar storage capacity to a conventional vector register file results in a more efficient register file from a power consumption perspective.

Returning now to FIG. 7, the address generation unit 710 is used to generate corresponding addresses for each of the N memory banks 730 as well as a control signal for the barrel shifter 740. The address generation unit 710 may receive an address for selecting pixel data from the striped register file 700 to transmit to each lane of the VPU 210 based on a stripe index and an offset (i.e., starting location). The stripe table 720 stores information related to the stripe (s) currently stored in the striped register file 700. The information includes a base address for the stripe, an offset for the stripe, and a size of the stripe. The base address refers to a starting register address in each memory bank associated with the pixel data for the stripe. The offset refers to a pixel offset between patches associated with the stripe. The size refers to a number of pixels included in the stripe. The address generation unit 710 may access the data in the stripe table 720 based on the stripe index included in the received address. The data in the stripe table may be used to calculate a particular address in each memory bank 740 storing the requested data based on the start position. The start position refers to the column within each patch corresponding to the requested pixel data.

The address generation unit 710, in conjunction with generating the corresponding addresses for each memory bank 730 to select the appropriate data within the stripe, generates a control signal for the barrel shifter 740. The control signal causes the barrel shifter 740 to shift the data from the N memory banks 730 to the appropriate lane of the VPU 210.

Although not shown explicitly, the striped register file 700 may include LD/ST circuitry for loading a stripe from the patch memory system 220 into the N memory banks 730 or storing a stripe from the N memory banks 730 to the patch memory system 220. The LD/ST circuitry may select an available slot in the stripe table 720 to use as an index into the stripe and load the stripe into the available registers of the N memory banks 730. The striped register file 700 may then return the index for the stripe in the stripe table 720 as a result of the load operation.

Figure 9:
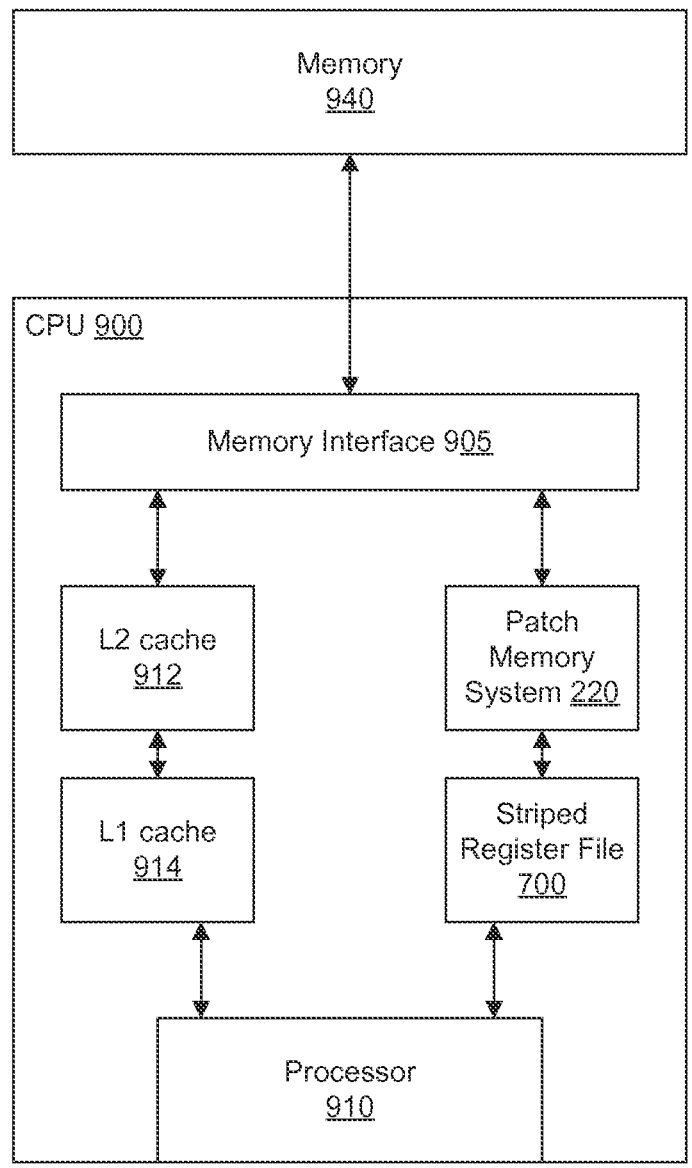
FIG. 9 illustrates a CPU that includes the patch memory system, in accordance with one embodiment.

FIG. 9 illustrates a CPU 900 that includes the patch memory system 220, in accordance with one embodiment. As shown above, the patch memory system 220 is included in a specialized PISP 200. However, in one embodiment, the patch memory system 220 may also be implemented in other processors, such as a conventional CPU.

As shown in FIG. 9, the CPU 900 may be coupled to a memory 940, such as an SDRAM memory, via a memory interface 905. The CPU 900 may implement a conventional multi-level cache hierarchy including an L2 cache 912 and one or more L1 cache units 914. Each L1 cache unit 914 is coupled to a processor 910. Although the CPU 900 shown in FIG. 9 only includes a single processor 910 (i.e., processing core, etc.), it will be appreciated that the CPU 900 may include multiple processors 910 and multiple corresponding L1 cache units 914. In addition to the typical multi-level cache hierarchy, the CPU 900 may also include a patch memory system 220 coupled to a striped register file 700.

In one embodiment, the CPU 900 may contain a number of processors 910 operating in parallel, and the patch memory system 220 and striped register file 700 operate to fetch data in parallel for the multiple processors 910. The patch memory system 220 and the striped register file 700 may operate as described above with respect to the PISP 200.

Figure 10:
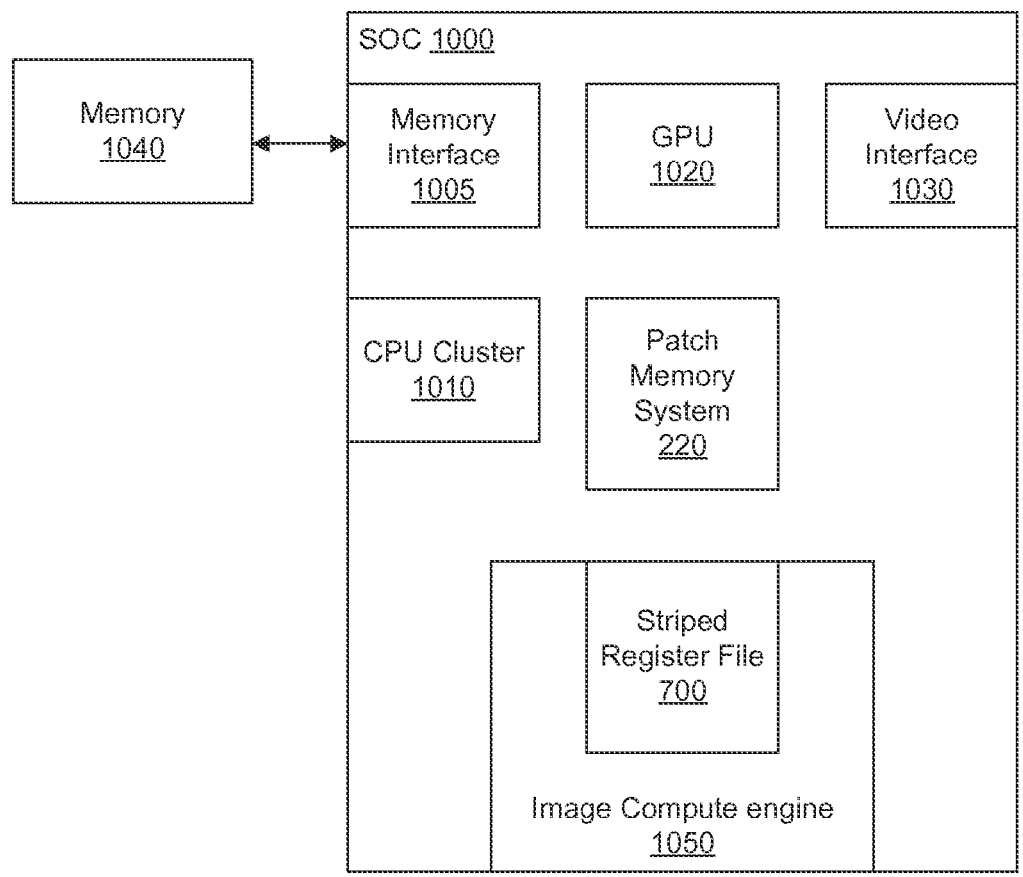
FIG. 10 illustrates a system-on-chip (SoC) that includes the patch memory system 220, in accordance with another embodiment.

FIG. 10 illustrates a system-on-chip (SoC) 1000 that includes the patch memory system 220, in accordance with another embodiment. The SoC 1000 is coupled to a memory 1040, such as an SDRAM memory, via a memory interface 1005. The SOC 1000 also includes a CPU cluster 1010, a GPU 1020, a video interface 1030. The CPU cluster 1010 may be a conventional CPU cluster found in typical SOCs that includes, for example, one or more multi-core RISC CPUs, such as a multi-core ARM CPU. The GPU 1020 may be a conventional SoC-based GPU such as an NVIDIA™ Maxwell 256 core GPU. The video interface 1030 may be a conventional video interface for outputting video as H.265 compressed video, 4k H.264 compressed video or any other type of video interface well-known in the art.

As shown in FIG. 10, the SoC 1000 may also include an image compute engine 1050 that includes a striped register file 700. The image compute engine 1050 may be coupled to a patch memory system 220 that is configured to fetch image data from the memory 1040 and supply the image data to the image compute engine 1050 via, e.g., the striped register file 700.

FIGS. 9 and 10 make clear that the patch memory system 220 and the striped register file 700 may be implemented in, or in conjunction with, various types of processors such as CPUs, GPUs, SoCs, VPUs, and the like. It will also be appreciated that the patch memory system 220 may be implemented with or without the striped register file 700. Similarly, the striped register file 700 may be implemented with or without the patch memory system 220.

Figure 11:
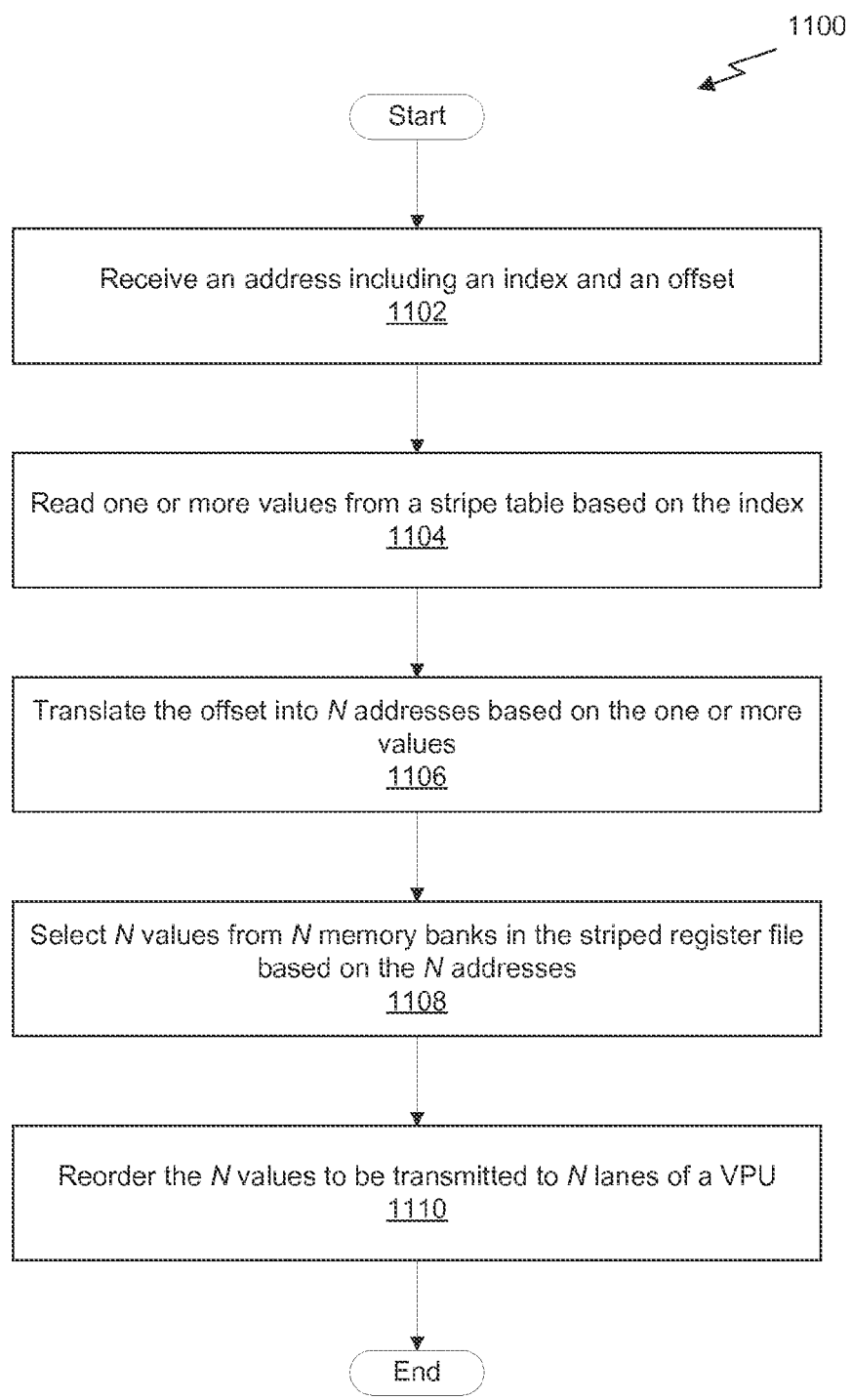
FIG. 11 illustrates a flowchart of a method for generating an address for values in a striped register file, in accordance with one embodiment.

FIG. 11 illustrates a flowchart of a method 1100 for generating an address for values in a striped register file 700, in accordance with one embodiment. The method 800 may be performed by a processor such as the PISP 200, CPU 900, or SoC 1000. At step 1102, the striped register file 700 receives an address including an index for a stripe and an offset associated with the selected values in the stripe. At step 1104, one or more values are read from a stripe table, where the one or more values correspond to the index received in the address. The values may include a base address for the stripe, an offset for the stripe, and a size of the stripe. At step 1106, an address generation unit 710 in the striped register file 700 translates the offset into N addresses corresponding to the N memory banks 730 of the striped register file base on the one or more values. At step 1108, N values are selected from the N memory banks 730 based on the N addresses. At step 1110, a barrel shifter 740 orders the N values to be transmitted to N lanes of a VPU 210.

Figure 12:
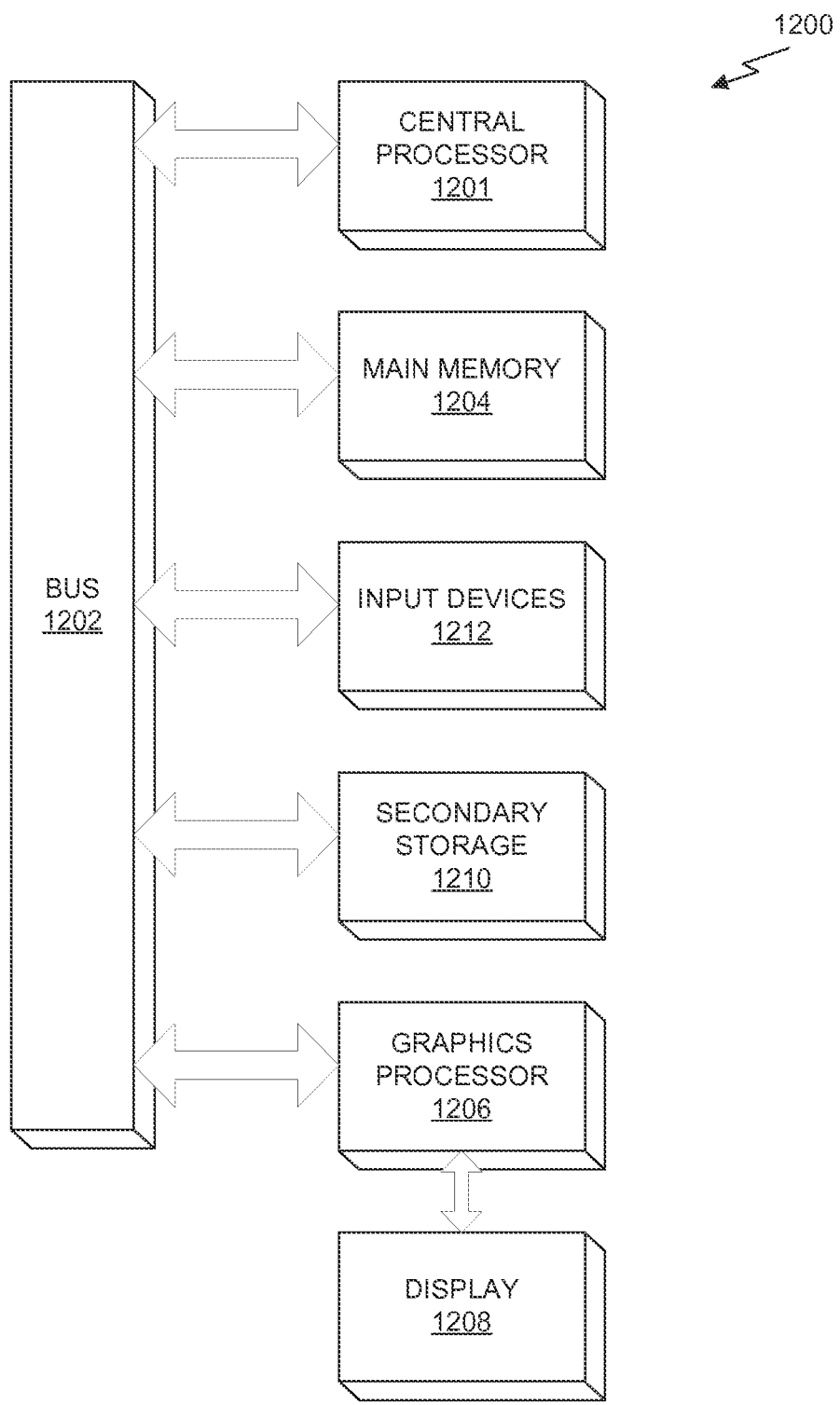
FIG. 12 illustrates an exemplary system in which the various architecture and/or functionality of the various previous embodiments may be implemented.

FIG. 12 illustrates an exemplary system 1200 in which the various architecture and/or functionality of the various previous embodiments may be implemented. As shown, a system 1200 is provided including at least one central processor 1201 that is connected to a communication bus 1202. The communication bus 1202 may be implemented using any suitable protocol, such as PCI (Peripheral Component Interconnect), PCI-Express, AGP (Accelerated Graphics Port), HyperTransport, or any other bus or point-to-point communication protocol(s). The system 1200 also includes a main memory 1204. Control logic (software) and data are stored in the main memory 1204 which may take the form of random access memory (RAM).

The system 1200 also includes input devices 1212, a graphics processor 1206, and a display 1208, i.e. a conventional CRT (cathode ray tube), LCD (liquid crystal display), LED (light emitting diode), plasma display or the like. User input may be received from the input devices 1212, e.g., keyboard, mouse, touchpad, microphone, and the like. In one embodiment, the graphics processor 1206 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1200 may also include a secondary storage 1210. The secondary storage 1210 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1204 and/or the secondary storage 1210. Such computer programs, when executed, enable the system 1200 to perform various functions. The memory 1204, the storage 1210, and/or any other storage are possible examples of computer-readable media.

In one embodiment, the architecture and/or functionality of the various previous figures may be implemented in the context of the central processor 1201, the graphics processor 1206, an integrated circuit (not shown) that is capable of at least a portion of the capabilities of both the central processor 1201 and the graphics processor 1206, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1200 may take the form of a desktop computer, laptop computer, server, workstation, game consoles, embedded system, and/or any other type of logic. Still yet, the system 1200 may take the form of various other devices including, but not limited to a personal digital assistant (PDA) device, a mobile phone device, a television, etc.

Further, while not shown, the system 1200 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
one or more processors; and
a patch memory system coupled to the one or more processors, the patch memory system comprising:
a memory interface configured to receive instructions for accessing patches in a memory;

a patch unit that includes a patch table for storing data corresponding to one or more patches;
an address translation unit for generating physical memory addresses for locations in the memory allocated to data associated with the patches;
an image table for storing data structures corresponding to one or more images that are associated with one or more tiles; and
a tile cache,
wherein the patch memory system is configured to fetch data associated with a patch by:
identifying the one or more tiles associated with an N-dimensional array of data corresponding to the patch, and
loading data for the one or more tiles from the memory into the tile cache.

2. The system of claim 1, wherein the N-dimensional array is an image comprising a plurality of pixels in a two-dimensional array.

3. The system of claim 2, wherein the memory interface includes:
a vector/word access unit for processing a first set of instructions to access data words in the memory;
a tile access unit for processing a second set of instructions to access tiles in the memory; and
a patch access unit for processing a third set of instructions to access patches in the memory.

4. The system of claim 1, wherein the patch unit further includes a patch shift engine configured to process instructions that cause an origin for a particular patch defined in the patch table to be shifted to a new location relative to an origin for a corresponding image in the one or more images.

5. The system of claim 4, wherein the patch shift engine implements at least one of a sliding window trace pattern, a sliding window Z pattern, and a sliding window diagonal pattern.

6. The system of claim 1, wherein the address translation unit includes:
a two-dimensional translation unit configured to generate memory addresses corresponding to two-element vectors;
a three-dimensional translation unit configured to generate memory addresses corresponding to three-element vectors; and
a boundary handling unit configured to generate memory addresses for pixels inside the boundary of an image based on coordinates located outside the boundary of the image.

7. The system of claim 1, wherein the tile cache includes a plurality of memory banks, and wherein image data associated with a tile is arranged in the plurality of memory banks such that pixel data for a plurality of adjacent pixels in a row or pixel data for a plurality of adjacent pixels in a column can be accessed in a single clock cycle.

8. The system of claim 1, wherein the tile cache includes a patch-to-tile unit configured to identify one or more tiles in the image associated with a particular patch based on an origin of the patch relative to an origin of an image and a size of the particular patch.

9. The system of claim 1, wherein a patch is specified by one or more fields included in the patch table, the one or more fields including at least an Origin field, a Height field, and a Width field.

10. The system of claim 9, wherein the Origin field comprises a two-element vector that specifies an x coordinate value and a y coordinate value relative to an origin of a source image associated with the patch.

11. The system of claim 1, wherein the one or more processors comprise a plurality of vector processing units, each vector processing unit including a plurality of lanes for processing data in parallel.

12. A non-transitory computer-readable storage medium storing instructions that, when executed by a processor, cause the processor to perform steps comprising:
receiving, by a memory interface, an instruction for accessing data associated with a patch in a memory;
identifying, by a patch unit that includes a patch table for storing data corresponding to one or more patches, the patch;
identifying, by a tile access unit, one or more tiles associated with an N-dimensional array of data corresponding to the patch;
generating, by an address translation unit, a physical memory address for a location in the memory allocated to data associated with the patch;
accessing an image table that stores a data structure corresponding to one or more images that are associated with the one or more tiles; and
loading data for the one or more tiles from the location in the memory into a tile cache included in the processor.

13. The non-transitory computer-readable storage medium of claim 12, wherein the N-dimensional array is an image comprising a plurality of pixels in a two-dimensional array.

14. The non-transitory computer-readable storage medium of claim 12, wherein a patch is specified by one or more fields included in the patch table, the one or more fields including at least an Origin field, a Height field, and a Width field.

15. The non-transitory computer-readable storage medium of claim 14, wherein the Origin field comprises a two-element vector that specifies an x coordinate value and a y coordinate value relative to an origin of a source image associated with the patch.

16. A programmable image signal processor, comprising:
one or more vector processing units; and
a patch memory system coupled to the one or more vector processing units, the patch memory system comprising:
a memory interface configured to receive instructions for accessing patches in a memory;
a patch unit that includes a patch table for storing data corresponding to one or more patches;
an address translation unit for generating physical memory addresses for locations in the memory allocated to data associated with the patches;
an image table for storing data structures corresponding to one or more images that are associated with one or more tiles; and
a tile cache,
wherein the patch memory system is configured to fetch data associated with a patch by:
identifying the one or more tiles associated with an N-dimensional array of data corresponding to the patch, and
loading data for the one or more tiles from the memory into the tile cache.

17. The programmable image signal processor of claim 16, wherein the N-dimensional array is an image comprising a plurality of pixels in a two-dimensional array.

18. The programmable image signal processor of claim 16, wherein the memory interface includes:
a vector/word access unit for processing a first set of instructions to access data words in the memory;

a tile access unit for processing a second set of instructions to access tiles in the memory; and
a patch access unit for processing a third set of instructions to access patches in the memory.

* * * * *